US011560322B1

(12) United States Patent
Lu

(10) Patent No.: US 11,560,322 B1
(45) Date of Patent: Jan. 24, 2023

(54) SELF-SUFFICIENT SYSTEMS FOR CARBON DIOXIDE REMOVAL AND SEQUESTRATION

(71) Applicant: James Cheng-Shyong Lu, Huntington Beach, CA (US)

(72) Inventor: James Cheng-Shyong Lu, Huntington Beach, CA (US)

(*) Notice: Subject to any disclaimer, the term of this patent is extended or adjusted under 35 U.S.C. 154(b) by 0 days.

(21) Appl. No.: 17/725,522

(22) Filed: Apr. 20, 2022

(51) Int. Cl.
| | |
|---|---|
| *C02F 1/26* | (2006.01) |
| *C02F 1/44* | (2006.01) |
| *C02F 101/10* | (2006.01) |
| *C02F 103/08* | (2006.01) |
| *C02F 1/28* | (2006.01) |
| *C02F 1/461* | (2006.01) |
| *C02F 1/66* | (2006.01) |

(52) U.S. Cl.
CPC ............. *C02F 1/286* (2013.01); *C02F 1/265* (2013.01); *C02F 1/441* (2013.01); *C02F 1/46104* (2013.01); *C02F 1/66* (2013.01); *C02F 2101/10* (2013.01); *C02F 2103/08* (2013.01); *C02F 2201/009* (2013.01); *C02F 2201/4612* (2013.01); *C02F 2209/245* (2013.01); *C02F 2307/00* (2013.01)

(58) Field of Classification Search
CPC ...... C02F 1/265; C02F 1/441; C02F 2101/10; C02F 2013/08; C02F 2201/009
See application file for complete search history.

(56) References Cited

U.S. PATENT DOCUMENTS

| | | | |
|---|---|---|---|
| 3,906,250 | A | 9/1975 | Loeb |
| 4,193,267 | A | 3/1980 | Loeb |
| 4,711,645 | A | 12/1987 | Kumar |
| 5,980,611 | A | 11/1999 | Kumar |
| 7,699,909 | B2 | 4/2010 | Lackner et al. |

(Continued)

FOREIGN PATENT DOCUMENTS

WO    WO-2020049579 A1  *  3/2020 ........... B01D 61/002

OTHER PUBLICATIONS

Mohammed D. Aminu et al., "A review of developments in carbon dioxide storage" Applied Energy 208, pp. 1389-1419 (2017).

(Continued)

*Primary Examiner* — Bradley R Spies
(74) *Attorney, Agent, or Firm* — Mei & Mark LLP; Manni Li

(57) ABSTRACT

A method and apparatus are disclosed for carbon dioxide removal and sequestration from ambient air or point source emissions by integration of four self-sufficient systems including a PEO renewable energy generation system, a desalination system, a pH-swing hydration or a direct hydration system, and a bicarbonate fixed, and alkalinity enhanced dense brine sequestration system, in which, the synergy between the PEO energy generation system and other three systems including provision of all needed renewable energy for operation of other three systems, the synergy between the desalination and other systems including provision of freshwater needed for the PEO energy generation system and the pH-swing system, as well as provision of a dense brine fluid from the desalination system to the pH-swing or the direct hydration system, and in the case of available freshwater supply where the desalination system can be avoided.

15 Claims, 13 Drawing Sheets

(56) References Cited

U.S. PATENT DOCUMENTS

| | | | |
|---|---|---|---|
| 7,887,694 | B2 | 2/2011 | Constantz et al. |
| 8,133,305 | B2 | 3/2012 | Lackner et al. |
| 8,246,731 | B2 | 8/2012 | Lackner et al. |
| 8,551,221 | B2 | 10/2013 | Wolfe |
| 8,702,847 | B2 | 4/2014 | Lackner et al. |
| 8,715,393 | B2 | 5/2014 | Wright et al. |
| 9,266,057 | B1 | 2/2016 | Jones |
| 9,283,510 | B2 | 3/2016 | Lackner |
| 9,474,998 | B2 | 10/2016 | Koo et al. |
| 9,555,365 | B2 | 1/2017 | Eisenberger et al. |
| 10,118,843 | B2 | 11/2018 | El-Naas |
| 10,239,017 | B2 | 3/2019 | Eisenberger et al. |
| 10,413,866 | B2 | 9/2019 | Eisenberger |
| 10,718,055 | B2 | 7/2020 | Ren et al. |
| 11,045,758 | B2 | 6/2021 | Peng |
| 11,092,141 | B1 | 8/2021 | Lu |
| 2011/0247336 | A9* | 10/2011 | Farsad ............ B01D 53/78 60/685 |
| 2014/0234946 | A1* | 8/2014 | Constantz ......... C04B 22/106 423/430 |
| 2021/0198136 | A1* | 7/2021 | Jani .................. B01D 71/56 |

OTHER PUBLICATIONS

Mother Nature Network' S John Platt, "Deserts Found to Be Major Carbon Dioxide Sink, Study Finds," Environment, pp. 1-2 (Apr. 10, 2014).

House. K.Z., et al., "Permanent carbon dioxide storage in deep-sea sediments," PNAS, vol. 103, No. 33, pp. 12291-12295 (Aug. 15, 2006).

Coninck.H., et al., "Strengthening and Implementing the Global Response," Chapter 4, pp. 313-443 (2018).

Lackner. K.S., et al., "Deep-sea sediments could safely store man-made carbon dioxide," MIT News, Massachusetts Institute of Technology, pp. 1-4 (Aug. 7, 2006).

Joseph H. Rheinhardt et al., "Electrochemical Capture and Release of Carbon Dioxide," ACS Energy Letters, No. 2, pp. 454-461 (2017).

Katie. L., et al., "Direct Air Capture: Resource Considerations and Costs for Carbon Removal," World Resources Institute (wri.org), pp. 1-9 (Jan. 6, 2021).

Rahimi. M, et al., "Carbon Dioxide Capture Using an Electrochemically Driven Proton Concentration Process," Cell Reports Physical Science, No. 1, pp. 1-19 (Apr. 22, 2020).

R. Sharifian et al., "Electrochemical carbon dioxide capture to close the carbon cycle," Energy & Environmental Science, No. 14, pp. 781-814 (2021).

Core Writing Team, R.K. Pachauri and L.A. Meyer (Eds.), "IPCC AR5 Synthesis Report, Climate Change 2014: Synthesis Report," Contribution of Working Groups I, II and III to the Fifth Assessment Report of the Intergovernmental Panel on Climate Change, pp. 1-169 (2014).

Pacala.S., et al., "Negative Emissions Technologies and Reliable Sequestration: A Research Agenda, " National Academy of Sciences(NAS), pp. 1-511 (2019).

* cited by examiner

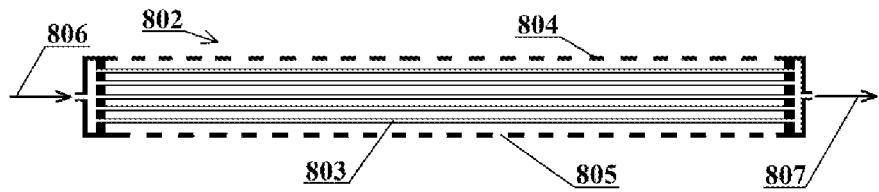
Fig. 10A  Prior Art
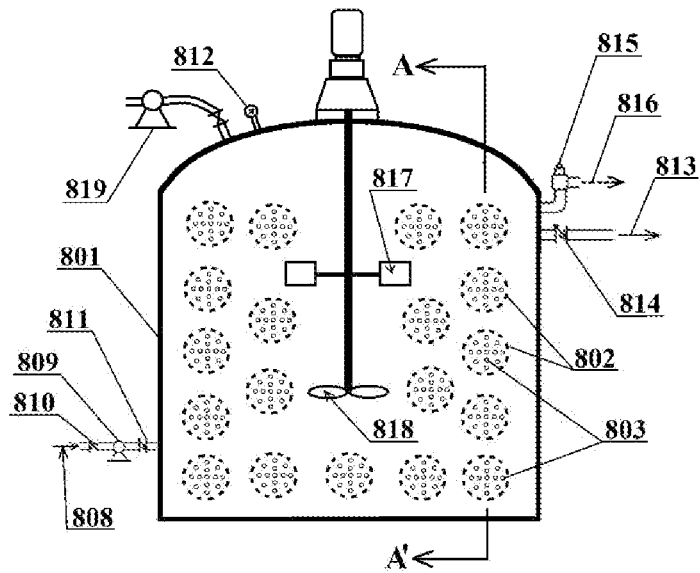
Fig. 10B  Prior Art
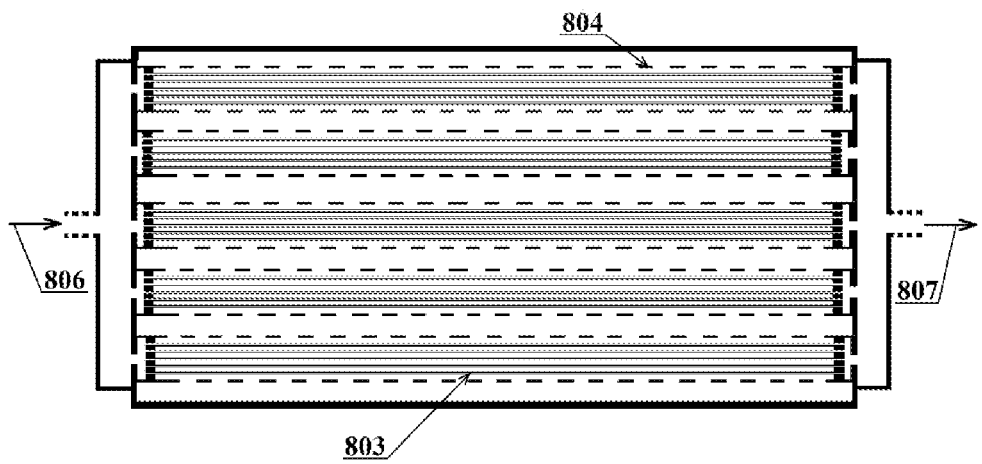
Fig. 10C  Cross-Section A-A' of Fig. 10B  Prior Art

SELF-SUFFICIENT SYSTEMS FOR CARBON DIOXIDE REMOVAL AND SEQUESTRATION

FIELD OF THE INVENTION

The present invention relates to a large-scale GHG (greenhouse gas) abatement method through carbon dioxide removal and sequestration through integration and synergistic effects of four systems including a PEO renewable energy generation system, a desalination system, a pH-swing hydration or a direct hydration system, and a bicarbonate fixation and alkalinity enhancement system.

BACKGROUND OF THE INVENTION

According to the Intergovernmental Panel on Climate Change (IPCC), to only reduce or eliminate existing carbon dioxide emissions caused by human contributions is unable to keep global temperature rise under 1.5° C. or 2° C. above pre-industrial levels (See IPCC AR5 Synthesis Report, Climate Change 2014; and IPCC, Global Warming of 1.5° C., Chapter 4, 2018). Negative emission technologies (NETs) that remove and sequester carbon dioxide from the atmosphere are required for achieving the 1.5° C. climate goal (National Academy of Science (NAS), Negative Emissions Technologies and Reliable Sequestration, 2019). Data provided by the IPCC show that approximately 10 gigatons of net $CO_2$ per year (10 Gt $CO_2$/yr) need to be removed and safely sequestered from the atmosphere by the year 2050 to keep global temperature rise under 1.5° C. or 2° C. Therefore, it is very important that for accomplishing the 1.5° C. climate goal any cost-effective negative emission technologies developed shall be scalable in removing atmospheric $CO_2$, ideally in the gigaton $CO_2$ per year range. To achieve the gigaton goal, stable, adequate, and affordable supply of sizable quantity of resources, such as energy, land, water, and other related material resources, are required. Supply of resources shall also not be location limited and shall not contribute greenhouse gas (GHG) emissions to affect the applications of the selected negative emission technologies. To meet the above concerns, for the supply of energy resource, it shall be scalable and renewable in nature without itself contributing any $CO_2$ and other air polluting emissions. Therefore, energy resources shall be selected from renewable sources such as hydraulic, solar, wind and geothermal energies, and shall be scalable to meet demands (such as meeting the high million tons $CO_2$ per year or gigaton $CO_2$ per year removal requirements). Due to the large-scale concerns, the selected location, land area, energy and material quantity constraints, and high-cost demands may, in many cases, become limitations for implementing negative emission technologies. Large-scale, stable, reliable, and around the clock supply of renewable energy is still difficult to find currently. Material resources for implementing negative emission technologies such as water, and other related chemicals needed shall be also in large scale supply, which in many cases are unpracticable, not economical, not easily executable and may involve with numerous social and negative environmental impacts. It is also required that the storage capacity for sequestration of $CO_2$ shall be large enough, economic, easily implementable, and stable and safe (no chance for leakage) for long time periods, ideally for geologic time periods. Development of negative emission technolog to avoid the above constraints are the main objectives of the subject invention.

The existing negative emission technologies reported in the open literature for carbon dioxide removal are taking numerous forms, including natural solutions, and innovated technological systems that accelerate current carbon dioxide removal rates. The negative emission technologies for carbon dioxide removal systems usually include the following three major integrated processes or steps: (1) atmospheric air collection system, (2) carbon dioxide capture and conversion or fixation system, and (3) carbon dioxide sequestration and/or utilization system. The major integrated systems which have developed and some of them are in the pilot or commercial scales are discussed below. One technology called "biochar" which is using plants to extract $CO_2$ from ambient air and then converting plant material into a charcoal-like substance and burying it in soil to store carbon away from the atmosphere for decades to centuries. Another technology already in the demonstration phase is known as "bioenergy with carbon capture and storage (BECCS)" where atmospheric $CO_2$ is absorbed by plants as they grow, and then the waste plant material (biomass) is burned or pyrolyzed to produce bioenergy. The $CO_2$ released in the production of bioenergy is captured before it reaches the atmosphere and stored in geological formations deep underground on very long-time scales. "Afforestation and reforestation" are also considered forms of carbon dioxide removal technology because they enhance natural $CO_2$ sinks. In the carbon dioxide removal system known as "direct air carbon capture and storage (DACCS)", $CO_2$ is extracted directly from the air and stored in geological formations deep underground. There are two main DACCS systems widely reported in use today applying either liquid solvent or solid sorbent to capture $CO_2$. A system called "coastal blue carbon" which through practices of land use and management that increase the carbon stored in living plants or near shore sediments in mangroves, tidal marshlands, seagrass beds, and other tidal or salt-water wetlands. A system called "accelerated weathering" in which $CO_2$ is removed from the atmosphere by using specific natural or artificial minerals which absorb $CO_2$ and fix it into other substances through chemical reactions occurring in the presence of water.

However, so far none of the above discussed negative emission technologies can fully overcome all the above discussed constraints. The most promising and already commercialized negative emission technologies discussed above are the BECCS technology and DACCS technology. One of major constraints for the BECCS technology may include land availability to raise feedstocks, in which according to the above NAS report, 30 million to 43 million hectares is required to raise the BECCS technology feedstocks per gigaton $CO_2$ per year of negative emissions. Thus, 10 gigatons $CO_2$ per year of negative emissions from the BECCS technology requires hundreds of millions of hectares of land, which is almost 40% of global cropland. Based on the above NAS (2019) reference, another major constraint of the BECCS technology is the availability and economic viability of other carbon sequestration resources discussed above. Besides, the BECCS technology will also be constrained by other biomass production activities such as, planting, irrigation, fertilization, harvesting, and transportation to the biomass conversion sites which could consume large quantity of other resources and generate large amount of greenhouse gases. Large scale use of the BECCS technology also will cause potential impacts regarding land-use change, land conservation (e.g., nutrient availability), and biodiversity. The BECCS technology will compete with afforestation/reforestation, as well as with food production and delivery of other ecosystem services. Therefore, large scale use of the BECCS technology for carbon dioxide removal would be limited.

Some of the DACCS systems used for carbon dioxide removal today are also already in the commercial stage. Large fans are usually used to push ambient air through a filter (providing with either a liquid solvent or a solid sorbent) to capture $CO_2$. These air collection and carbon capture facilities can be built near geologic storage sites to avoid occupation of arable land and minimize transportation requirement. However, large land area is still needed for the generation and use of renewable energy. Based on the World Resources Institute report for a commercial liquid solvent system using potassium hydroxide (KOH) solution (WRI 2021, Direct Air Capture: Resource Considerations and Costs for Carbon Removal), to capture 1 Mt $CO_2$ per year, the land requirement is 0.4 $Km^2$ for the liquid solvent direct air capture (DAC) system and 7.7 $Km^2$ for the solar photovoltaic (PV) system (the electricity generation by the solar photovoltaic system is only for the solvent absorption operation of the direct air capture, electricity required for the regeneration of solvent is too high so natural gas is still needed); and for a commercial solid sorbent system is 1.2 to 1.7 $Km^2$ for the direct air capture system and 23 $Km^2$ for the solar photovoltaic system. Based on the above data, capturing 1 gigaton $CO_2$ per year using the photovoltaic renewable energy resource, the liquid solvent direct air capture system may require an area roughly the size of Vermont. Based on the above NAS (2019) report, deployment of the DACCS technology at 1 Gt/yr CO2 removal and assuming \$100/t $CO_2$ capture cost, the total investment would be about \$100 billion per year or 0.5 percent of U.S. gross domestic product (GDP). At a global scale of 10 Gt $CO_2$/yr removal and \$100/t $CO_2$, the total investment increases to about \$1000 billion or 1.2 percent of global GDP. The range of costs for direct air capture vary between \$250-\$600 today depending on the technology choice. Therefore, the energy resource, land resource and cost concerns may become major constraints to scale up the DACCS systems to reach the 1.5° C. global warming goal. As for the other resource requirements such as water requirement, for a liquid solvent direct air capture system, capturing 1ton of CO2 can require between 1 and 7 tons of water, vary widely depending on the relative humidity and temperature variations of the plant's location. The water requirements for solid sorbent direct air capture systems in use today also vary widely, depending on the sorbent regeneration method, ranging from very minimal water losses to about 1.6 tons of water per ton of $CO_2$ captured, based on the WRI report (2021).

Many liquid solvent and solid sorbent chemicals have been developed for the DACCS systems. Conventional liquid solvent systems are using amine-based, alkali-based or alkali-earth based liquids to capture $CO_2$ from the air. An earlier liquid solvent direct air capture pilot-scale plant developer, Carbon Engineering founded in 2009, is using KOH solution as $CO_2$ capture liquid solvent to form carbonate solution. The carbonate solution is salt out from solution into precipitates and then heated to a temperature about 900° C. by a calciner to regenerate chemical and release pure carbon dioxide gas ($CO_2(g)$) for sequestration. U.S. Pat. Nos. 7,699,909B2, 8,246,731B2, and 8,702,847B2, all to Lackner et al., disclose using NaOH solution to absorb $CO_2$ and convert to $Na_2CO_3$ liquid. Then the liquid is converted to $CaCO_3$ solid species by reaction with a $Ca(OH)_2$ solution. Then, the $CaCO_3$ species is regenerate to $Ca(OH)_2$ again by heat and release $CO_2(g)$ for sequestration. U.S. Pat. No. 7,887,694 B2 to Constantz et al. discloses using alkaline-earth-metal-containing waters as the liquid solvents for $CO_2$ capture. The metallic carbonate precipitates are formed and captured and sequestered directly to disposal locations. U.S. Pat. No. 9,266,057B1 to Jones, which is based on Henry's gas law, discloses using an aeration process to dissolve $CO_2$ and a deaeration process to concentrate $CO_2$ until the gas is reaching desirable purity for sequestration.

Many of the solid sorbent chemicals for $CO_2$ removal are using adsorption-desorption mechanisms, accompanying with moisture-swing, temperature-swing, or pressure-swing methods to release captured $CO_2$. For example, U.S. Pat. No. 4,711,645 to Kumar discloses using a CO2 removing process with alumina and zeolite adsorbents at 70-120° F., 50-150 psi, and release $CO_2(g)$ by reduction to room temperature and atmospheric pressure. U.S. Pat. No. 5,980,611 to Kumar et al. discloses further modified the temperature-swing from 0-50° C. to room temperature, and pressure-swing from 0.9-50 bars to atmospheric pressure. U.S. Pat. No. 8,133,305B2 to Lackner et al. discloses using sorbents including zeolite, alumina materials, activated magnesia, activated iron oxide, with embedded positive ions comprising metal oxides or metal hydroxides, and individually mobile negative ions. $CO_2(g)$ is captured by the anions on surface of the sorbent, then $CO_2(g)$ is released, and the sorbent is regenerated by operations such as moisture-, temperature-, and voltage-swings. U.S. Pat. No. 8,715,393B2 to Wright et al. discloses including a $CO_2(g)$ removal method by contacting the air stream with a dry resin, then wetting the resin to release $CO_2(g)$ from water vapor. U.S. Pat. No. 9,283,510B2 to Lackner discloses preparation of $CO_2$ capturing material by soaking an ion-exchange material in water to replace the chloride ions with hydroxide or carbonate ions, then dry the sorbent for the $CO_2$ collection. U.S. Pat. Nos. 9,555,365B2, 10,239,017B2, and 10,413,866B2 to Eisenberger et al. diclose an amine sorbent medium to absorb $CO_2$ from air under ambient condition, and then to release $CO_2(g)$ and regenerate the sorbent medium by a thermal-swing operation at a temperature not greater than 130° C.

In addition to the above discussed chemical or physico-chemical processes, a pH-swing concept using electrochemical processes also has been used for $CO_2(g)$ capture, in which the $CO_2$ is usually captured in an alkaline working fluid in the cathodic cell and $CO_2$ is then recovered and released by shifting to the acidic fluid in the anodic cell by a pH-swing operation. The current pH-swing electrochemical processes for $CO_2$ removal include using methods of electrolysis, bipolar membrane electrodialysis (BPMED), capacitive deionization or reversible redox reactions as reported in the open literature (Rahimi et al., Cell Reports Physical Science 1, 2020; Rheinhardt, et al., ACS Energy Lett., 2, 2017; Sharifian et al., Energy Environ. Sci., 14, 2021). The recovered $CO_2$ through the pH-swing electrochemical processes is usually released in pure $CO_2(g)$ form for the subsequent sequestration. In some rare cases the captured $CO_2$ are released as insoluble carbonate salts by adding soluble salts or polyvalent cation materials such as $Ca^{+2}$, $Mg^{+2}$, $Sr^{+2}$ salts, or fly ash or olivine into the cathodic cell, as disclosed in U.S. Pat. No. 10,718,055B2 to Ren et al. Comparing to the conventional chemical absorption/adsorption methods discussed above, advantages of the pH-swing electrochemical processes for $CO_2$ capture and recovery are more flexible, sustainable, relatively rapid, and do not require use of any special expendable chemicals. However, the main challenge for the currently available electrochemical methods is the high energy consumption.

A CO$_2$ capture method without the need for chemicals is based on hydration of CO$_2$ gas stream in the seawater to dissolve CO$_2$(g) into carbonic acid (H$_2$CO$_3$(aq)) and bicarbonate ion (HCO$_3^-$). As disclosed in U.S. Pat. No. 11,045,758B2 to Peng, the capture of CO$_2$ from air or flue gas is accomplished by scrubbing the gas stream with surficial seawater under room temperature and atmospheric pressure to dissolve the CO$_2$ gas into seawater, and then discharge the captured carbon species to the water column of ocean again for carbon sequestration. Major advantages of seawater hydration for CO$_2$ capture are without the need for chemical(s), relatively low operation cost, more secure storage option than storage as a CO$_2$ free-phase plume, and virtually no limit for the amount of CO$_2$ gas stream for sequestration. However, the following disadvantages may be involved: (1) majority (>99%) of dissolved CO$_2$(g) after hydration exists as CO$_2$(aq) rather than H$_2$CO$_3$(aq) under the room temperature and atmospheric pressure conditions, (2) although dissolution of CO$_2$(g) to CO$_2$(aq) is rapid, but conversion of CO$_2$(aq) to H$_2$CO$_3$(aq) is relatively slow, which affect the formation of HCO$_3^-$ ion for sequestration, (3) discharge of hydrated CO$_2$ seawater into the seawater column again could lower the pH of seawater which may affect marine lives, and (4) dissolved CO$_2$(aq) and H$_2$CO$_3$(aq) sequestered in the seawater column may be released back to the atmosphere due to pH change and/or other environmental condition changes such as temperature and pressure changes.

Desalination technology has been used to assist the CO$_2$ capture. U.S. Pat. No. 8,551,221B2 to Wolfe discloses utilizing ammonia in saltwater, such as seawater, wastewater, saline groundwater, or cooling tower blowdown, to absorb CO$_2$ from a gas stream to form ammonium carbonate in the captured fluid. The captured fluid is first treated to remove the formed solid crystals of ammonium carbonate species, and then applying the fluid as a draw solution in the forward osmosis (FO) operation for desalination to dilute the saltwater. The diluted saltwater from the FO operation, containing ammonium carbonate, is then heated to vaporize ammonia for reuse. A small hydro turbine generator is used to recover energy based on the conventional pressure retarded osmosis (PRO) process. However, disadvantages of this invention for carbon dioxide removal may include: (1) large amount of heat energy is needed, typically 400-500 btu/pound of CO$_2$ removal, for the recovery of ammonia, (2) losing of ammonia due to formation of ammonium carbonate crystals, (3) ammonia is toxic, corrosive, and explosive (13-28% by volume), and (4) using PRO process for the energy generation, in this case with a low dilution factor, may not be worthwhile due to high pressure is needed for the draw solution input which would consume most of the energy generated again (refer to explanation in U.S. Pat. No. 11,092,141B1 for details).

A system disclosed in U.S. Pat. No. 9,474,998B2 to Koo et al. combines CO$_2$ capture and desalination. An absorption solution is used to capture CO$_2$, and then use this solution as a draw solution for the forward osmosis operation which is similar to that described in the above U.S. Pat. No. 8,551,221B2. Ammonia is also used as the absorption chemical in this invention, therefore, disadvantages as discussed above will happen here. The difference between this invention to the previous Wolfe invention is without the use of a PRO system to recover energy.

U.S. Pat. No. 10,118,843B2 to El-Naas also discloses a combined CO$_2$ capture and desalination system. In this invention, the CO$_2$ absorption solutions comprise sodium chloride, and calcium oxide and/or calcium hydroxide, at a pH level equal or higher than 10. The concentration of the input CO$_2$ stream is required to be equal or greater than 0.1%. A reverse osmosis (RO) type of desalination process is used to filter out the solid sodium bicarbonate species produced in the CO$_2$ capture process. Major difference comparing to the above carbon removal and desalination combined processes is the avoidance of intensive energy requirement for the recovery of ammonia in this method. However, this method is still suffered by disadvantages such as: (1) using CaO and/or Ca(OH)$_2$ chemicals which would require mineral resources and energy to manufacture, which may not be feasible when a large scale carbon dioxide removal system is implemented, (2) concentration of input CO$_2$ stream shall be greater than 0.1%, which may not be feasible for the removal of CO$_2$ from the air (only 0.04% by volume), and (3) using reverse osmosis (RO) to filter out solid sodium bicarbonate species requires intensive energy also.

After the CO$_2$ capture and release step discussed above, the next step of the carbon dioxide removal is carbon sequestration. CO$_2$ permanent sequestration methods applied so far involve storage of CO$_2$ in the oceanic, or terrestrial environments, such as (1) bio-sequestration (through photosynthesis by plants either on land or in ocean and converting to biochar or storing dead plants in soil, wet lands or sediments for long-term storage), (2) underground geological sequestration (such as injection of CO$_2$(g) to saline aquifers, oil fields, un-mineable coal seams, and underground porous basalt rock formations), (3) ocean storage (either converting CO$_2$(g) to bicarbonate and storing in a relative shallow water column, or injecting into deeper ocean water, forming liquid CO$_2$ (CO$_2$(l)) below 1000 m as a rising droplet plume, or injecting CO$_2$(l) below 4000 m and sinking on a sea floor), and (4) mineral carbonation (reaction of CO$_2$(aq) with alkaline earth metal oxides or hydroxides to produce stable carbonate in geological reservoirs). The above four types of sequestration methods are widely discussed in the open literature, such as National Academy of Science (NAS), Negative Emissions Technologies and Reliable Sequestration, 2019; and Aminu, et al, 2017, Applied Energy 208, pp. 1389-1419.

A recent study discovered that deserts could serve as a sink for significant levels of carbon dioxide, removing it from the atmosphere and storing it in the ground (Environment: Deserts Found To Be Major Carbon Dioxide Sink, Study Finds, Apr. 10, 2014). In the report Professor Evans indicated that arid regions on earth could increase the CO$_2$ intake enough to account for somewhere between 15 and 28 percent of all carbon dioxide currently being absorbed by all of the Earth's land surfaces. Desert lands occupy a large area on earth and would be a good candidate for large amount of carbon sequestration. However, the permanent storage of CO$_2$ in the desert soils and rocks requires a great amount of water to fix the carbon through weathering process.

The ocean sequestration methods discussed above and suggested in the open literature mainly involve injection of CO$_2$(g) into the seawater at various depths below 1000 m, or injection of a dense CO$_2$ seawater mixture at a depth at 500 to 1000 m. At typical temperatures and pressures that exist in the ocean, based on the CO$_2$ characteristics, injection of pure CO$_2$(g) would become a gas form above about 500 m and a liquid form below that depth. Injection of the captured pure CO$_2$(g) would form liquid CO$_2$ (CO$_2$(l)) below 1000 m as a rising droplet plume. Density of CO$_2$(l) is smaller than that of seawater at depth above about 3000 m so there is a possibility for carbon to leak back to atmosphere again. A solid CO$_2$ hydrate can be formed below about 500 m depth depending on the relative compositions of CO$_2$ and H$_2$O as well as the environmental conditions. $CO_2$ hydrate can be formed in the mixture of $CO_2(g)$ and water at pressure as low as 10 atmospheres with temperatures of -1.5° C. Injecting $CO_2(l)$ below 4000 m and sinking on a sea floor, where less ocean water movement occurred, may be a good solution, but require a relatively large energy to implement. Conversion of $CO_2(g)$ to bicarbonate species and inject into the seawater column is considered a much better carbon dioxide removal sequestration method due to the stability of bicarbonate in seawater. Based on physical chemistry, a large quantity of $CO_2$ (far exceeding the estimated available fossil energy resources of 5,000-10,000 GtC) may be dissolved in ocean waters as bicarbonate. Injection of bicarbonate, $CO_2(l)$, or hydrate into the deep ocean water may be a good solution but less studied. Hydration of the captured $CO_2$ species, fixation into bicarbonate species, and then injection into the interstitial water in deep marine sediments is believe even a better sequestration method as proposed by the present invention. According to reported calculation data, deep-sea sediments could provide a virtually unlimited and permanent reservoir for $CO_2$ sequestration (MIT News, 2006: Deep-Sea Sediments Could Safely Store Man-Made Carbon Dioxide; and House et al. 2006: Permanent Carbon Dioxide Storage in Deep Sea Sediments).

SUMMARY OF THE INVENTION

The present invention provides a method with four types of synergistic and self-sufficient systems with the capability to enlarge the scale to a gigaton level for carbon dioxide removal (CDR). The large-scale and self-sufficient greenhouse gas abatement method of the present invention is provided through carbon dioxide removal and sequestration integration of four major self-sufficient systems including a pressure-enhanced osmosis (PEO) renewable energy generation system, a desalination system, a pH-swing hydration or a direct hydration system, and a bicarbonate fixed and alkalinity enhanced dense brine sequestration system. The synergy between the PEO energy generation system and other three systems is to provide all renewable energy needed for operation of these systems. The synergy between the desalination and other systems is to provide freshwater needed for PEO energy generation and pH-swing electrolysis, and to provide a dense brine fluid to the pH-swing or the direct hydration system to convert the carbon dioxide into a stable bicarbonate loaded and alkalinity enhanced fluid for sequestration. The present invention can be applied to both atmospheric carbon dioxide and point source carbon dioxide removal and sequestration. When freshwater, including river water and/or treated wastewater, is available the desalination system can be avoided, and therefore, the present invention can be run anywhere in the world and sequestration sinks can be in terrestrial or marine environments as long as the carbon dioxide removal plant installation area is available and sequestration sinks can be located nearby. The captured carbon dioxide also can be converted into pure carbon dioxide species to utilize for industrial or agricultural purposes when needed. The by-product of power and fresh water generated can be recovered for domestic, industrial and/or agricultural applications. Extra energy generated by the PEO process also can be sold to assist the carbon removal economy.

The method for removing and sequestering carbon dioxide of the present invention comprises installing and applying an integrated and self-sufficient system in an ocean environment, wherein the integrated systems comprises a PEO renewable energy generation system, a desalination system, a pH-swing hydration or a direct hydration system, and a carbonate sequestration system that are integrated with each other and have synergistic effects; applying the PEO renewable energy generation system to provide renewable energy for operating the desalination system, the pH-swing hydration or the direct hydration system, and the carbonate sequestration system for carbon removal and sequestration; applying the desalination system to provide freshwater for the PEO renewable energy generation system and the pH-swing hydration system and concentrated brine to the pH-swing hydration or the direct hydration system to enhance carbon dioxide hydration and fixation capacity to stable bicarbonate and to form dense alkalinity enhanced and bicarbonate fixed brine for safe sequestration; applying the pH-swing hydration or the direct hydration system to fix collected carbon dioxide gas from ambient air or point source emissions into mainly bicarbonate species by using the energy from the PEO renewable energy generation system, the brine and freshwater from the desalination system, and generating a dense bicarbonate loaded fluid for the carbon sequestration system; and applying the carbon sequestration system to store the carbon dioxide fixed fluid into marine sediments below a bioturbation layer, wherein the energy required for the systems are all generated in-situ, and all materials required for the systems are withdrawn and produced from in-situ seawater to form the integrated and self-sufficient system for carbon removal and sequestration.

In the method for removing and sequestering carbon dioxide of the present invention, the PEO renewable energy generation system, the desalination system, and the hydration system may be located in the ocean environment at a same depth on an ocean floor, installed with optionally an enclosure structure, and using seawater gravity to supply pressure for operation.

In the method for removing and sequestering carbon dioxide of the present invention, the same depth on the ocean floor is optimized by selecting for the PEO renewable energy generation system at a depth equivalent to $\frac{1}{2}\alpha\beta\Delta\pi_o$ of pressure, $\alpha$ is a membrane efficiency factor representing an efficiency of pressure loss across the membrane, and $\beta$ is a dilution factor $=Q_2/(Q_1+Q_2)$, $Q_1$ is a permeate flux, $Q_2$ is a draw solution flux, and $\Delta\pi_o$ is a theoretical maximum osmotic pressure differential in a forward osmosis reactor of the PEO renewable energy generation system, and a pressure is provided to reverse osmosis operation in the desalination system by power generated by the PEO renewable energy generation system.

In the method for removing and sequestering carbon dioxide of the present invention, when the same depth on the ocean floor is selected, the optimum depth is selected at between 540 m to 820 m for the desalination system with the reverse osmosis operation, the depth of the hydration system is selected at the same depth as the desalination system, and the optimum pressure of a seawater draw solution needed for the PEO renewable energy generation system is adjusted by an energy exchanger to a pressure equivalent to $\frac{1}{2}\alpha\beta\Delta\pi_o$.

In the method for removing and sequestering carbon dioxide of the present invention, when freshwater is available, the desalination system is replaced by an extra hydraulic power generation facility located at the same depth as the optimum depth equivalent to $\frac{1}{2}\alpha\beta\Delta\pi_o$ of the PEO renewable energy generation system by bring down the freshwater to the extra hydraulic power generation facility with a penstock.

In the method for removing and sequestering carbon dioxide of the present invention, the bicarbonate fluid for the sequestration system is injected at a selected depth at at least one hundred meters below a marine sediment in either a continental shelf, a continental slope, or a continental rise area, and an estimated top boundary of a final injection plume of the sequestered bicarbonate fluid is selected at least ten meters below a bioturbation layer of the marine sediments to prevent impacts to any marine life living on or in the marine sediments.

In the method for removing and sequestering carbon dioxide of the present invention, the PEO renewable energy generation system, the desalination system, and the hydration system are located in an ocean at different depths on an ocean floor with or without an enclosure structure for each system using a seawater gravity to supply pressure for operation.

In the method for removing and sequestering carbon dioxide of the present invention located in an ocean at different depths on an ocean floor, the individual optimum depths are selected as follows: (1) an optimum depth equivalent to $\frac{1}{2}\alpha\beta\Delta\pi_o$ of pressure is selected for the PEO renewable energy generation system, $\alpha$ is a membrane efficiency factor representing an efficiency of pressure loss across a membrane, and $\beta$ is a dilution factor=$Q_2/(Q_1+Q_2)$, $Q_1$ is permeate flux, $Q_2$ is draw solution flux, and $\Delta\pi_o$ is theoretical maximum osmotic pressure differential in the forward osmosis reactor of the PEO renewable energy generation system; (2) an optimum depth in a range of 540 m to 820 m is selected for the desalination system with reverse osmosis operation, and depth for the hydration system is the same as the desalination system; (3) when freshwater is available, the desalination system is replaced by an extra hydraulic power generation facility located at the same depth as the PEO renewable energy generation system by bringing down freshwater to the hydraulic power generation facility with a penstock; (4) depths for injecting a bicarbonate fluid for the sequestration system is selected at at least 100 meters below the marine sediment in either a continental shelf, a continental slope, or a continental rise area where an estimated top boundary of a final injection plume of the sequestered bicarbonate fluid is at least ten meters below a "bioturbation layer" of the marine sediments to prevent impacts to marine life living on or in the marine sediments.

In the method for removing and sequestering carbon dioxide of the present invention, the desalination system is avoided when freshwater is available, the PEO renewable energy generation system and the hydration system are located above ground on earth, and fixed carbonate solutions are sequestered by injection to soil without depth limitation.

When the present system are located above ground on earth, the present invention further provides a PEO renewable energy generation system used in the method for removing and sequestering carbon dioxide, wherein the PEO renewable energy generation system uses a draw solution with a concentrated fluid prepared from stable and nontoxic inorganic salts or from stable and nontoxic organic species in 100 to 500 molecular weight, and the draw solution is re-concentrated and recycled by nanofiltration or ultrafiltration to avoid constant supply of the draw solution chemicals.

The present invention further provides a method for converting an existing desalination plant to an integrated desalination, PEO energy generation and carbon dioxide hydration and sequestration facility, comprising using penstocks to divert portion of the freshwater and all of the brine produced by the existing desalination plant to an optimum depth equivalent to $\frac{1}{2}\alpha\beta\Delta\pi_o$ of the PEO renewal energy generation system, wherein $\alpha$ is a membrane efficiency factor representing an efficiency of pressure loss across the membrane, $\beta$ is a dilution factor and is $Q_2/(Q_1+Q_2)$, $Q_1$ is permeate flux, $Q_2$ is draw solution flux, and $\Delta\pi_o$ is theoretical maximum osmotic pressure differential in a forward osmosis module of the PEO renewable energy generation system, $\beta$ is selected at a range of 0.8 to 0.9; using sets of turbine-generator for extra hydraulic power generation; using about 10% to 20% of freshwater produced by the existing desalination plant as a feed solution for the PEO renewal energy generation system, using all the brine produced by the existing desalination plant by the PEO renewal energy generation system as the draw solution, and using a final brine fluid generated by the PEO renewable energy generation system for the subsequent $CO_2(g)$ hydration and marine sediment sequestration systems to discharge brine and sequestered carbonate fluid.

The present invention further provides a cylindrical pH-swing hydration reactor for the fixing of $CO_2(g)$ collected from either ambient air or from point source emissions, comprising a cylindrical separation plate (905) providing inside the cylindrical pH-swing hydration reactor (901) to separate the cylindrical reactor into a cathodic zone A and an anodic zone B; multiple cathodes (902) providing in the cathodic zone A; multiple anodes (903) providing in the anodic zone B; multiple air rising retardation devices (904) installing in the cathodic zone A to increase the detention time of air bubbles to enhance the $CO_2(g)$ hydration into bicarbonate ion and carbonate ion species; multiple turbine mixers (915) attaching to each of the air rising retardation device (904) to provide circulation of fluid flow directions in the zone A to increase gas dissolution time; multiple modified venturi devices (906) arranging near bottom and along the outside boundary of the cylindrical pH-swing reactor (901) to inject brine or seawater into the zone A to create turbulent flow conditions to expedite the dissolution and fixation of $CO_2(g)$ in air streams (908); a nozzle (912) for the inject of a tangential freshwater flow into the zone B for electrolysis to prevent chlorine gas generation during electrolysis; a waste air zone C at top of the pH-swing reactor (901) for the storage and discharge of a waste air output flow (913), and a modified venturi device (906) near top of zones A and B to mix electrolytes from zones A and B, for discharging fixed carbonate fluid for sequestration.

In the cylindrical pH-swing hydration reactor of the present invention, the cylindrical pH-swing hydration reactor may be converted to a pure $CO_2(g)$ fixation, recovery, and utilization reactor by changing an existing cylindrical separation plate to a porous cylindrical separation plate, and covering the porous plate by an anionic membrane (919), and installing another new porous cylindrical separation plate (905) near anodic electrodes (903) and covering by a cationic membrane (920), in order for the $H^+$ generating by the anode electrodes to filter through the cationic membrane, and bicarbonate and carbonate ions generating in the zone A to filter through the anionic membrane to form a pure $CO_2(g)$ and collected in zone D and output through output flow (917) for collection and utilization, with other oxygen gas collecting in zone E to separate from the pure $CO_2(g)$.

The present invention further provides a cylindrical direct hydration reactor for fixing and sequestering $CO_2(g)$ collected from either an ambient air or from point source emissions, comprising multiple air rising retardation devices (1002) to increase detention time of air bubbles in the reactor to enhance the $CO_2(g)$ hydration into mainly bicarbonate ion species; multiple turbine mixers (1003) attaching to each of the air rising retardation device (1002) to provide circulation of fluid flow directions in the reactor to increase $CO_2(g)$ dissolution time; a modified venturi device (1006) arranging near bottom of the direct hydration reactor (1001) to inject brine or seawater into the reactor to create turbulent flow conditions to expedite the dissolution and fixation of $CO_2(g)$ in air streams (1005); a waste air zone at top of the reactor (1001) for the storage and discharge of a waste air output flow (1011); and a bicarbonate hydrated output fluid (1010) is pumped to a sequestration area.

In the cylindrical direct hydration reactor of the present invention, the cylindrical direct hydration reactor may be converted into multiple reactors in series to reduce the reactor sizes and increase the dissolution efficiency, selecting an overall detention time for the reactor design at the range of 100 to 150 sec to ensure reaching saturation condition, and selecting a pressure for the multiple direct hydration reactors (1001) as that of a reverse osmosis desalination reactor for supplying brine or seawater to the multiple cylindrical direct hydration reactors (1001) or a reactor pressure for the multiple direct hydration reactors (1001) for subsequent injection of a sequestration fluid.

BRIEF DESCRIPTION OF THE DRAWINGS

The present invention will be described in more details by way of example only, with reference to the accompanying drawings. The following drawings are provided:

FIG. 2A shows the process flow diagram of an "above ground" option where freshwater is available for the PEO renewable energy generation and pH-swing systems, and seawater is available for the pH-swing system; FIG. 2B shows the process flow diagram of an "in the ocean" option where freshwater and seawater are available and extra power is generated by a hydraulic power generation system; and FIG. 2C shows the process flow diagram of the "in the ocean" option where a desalination system is used to provide freshwater to both the PEO renewable energy generation and pH-swing systems.

FIGS. 10A to 10C show the systems disclosed in U.S. Pat. No. 11,092,141 B1, where FIG. 10A shows the tubular forward osmosis module; FIG. 10B shows the PEO renewable energy generation system; and FIG. 10C shows the A-A' cross-sectional view of FIG. 10B.

FIG. 11A shows the pH-swing system; FIG. 11B shows the X-X' cross-sectional view of FIG. 11A; FIG. 11C shows the pH-swing system where $CO_2(g)$ with some $O_2(g)$ impurity are recovered for a utilization option in the present invention; FIG. 11D shows the X-X' cross-sectional view of FIG. 11C; FIG. 11E shows the pH-swing system where pure $CO_2(g)$ is recovered for a utilization option in the present invention; and FIG. 11F shows the X-X' cross-sectional view of FIG. 11E.

FIG. 12A shows the direct hydration reactor for carbon dioxide capture and fixation; and FIG. 12B shows the direct hydration reactors in series for carbon dioxide capture and fixation.

DETAILED DESCRIPTION OF THE INVENTION

1. Basic Principles and Options of the Present Invention

Based on the above discussions on related background arts, in order to achieve a carbon dioxide removal at the gigaton scale with acceptable effectiveness and costs, the following criteria shall be considered: (1) energy needed for the carbon removal shall be renewable energy in nature and its supply shall be abundant, steady, does not require large land areas, and can achieve round the clock continuous supply without constraints; (2) supply of materials and chemicals shall not be limited in the gigaton scale operation conditions, and processing of these materials and chemicals shall not generate significant amount of carbon dioxide; (3) sequestration location, capacity (to 10 Gt $CO_2$/yr capacity), durability (preferably to a geologic time scale), and security (only minimum leakage potential) to store the carbon dioxide fixed product(s) shall be easy to obtain; (4) overall carbon removal and sequestration costs shall be acceptable per ton of $CO_2$ removed; and (5) proposed system(s) shall not cause secondary environmental impacts.

The present invention is developed based on the above criteria for the carbon dioxide removal and sequestration. The method of the present invention is an integrated method which uses four separated systems associated together for the synergistic effects to achieve a self-sufficient operation so energy, materials, and chemicals can be obtained in-situ and supply from outside the system can be avoided. The four systems are: (1) System A: the pressure-enhanced osmosis (PEO) renewable energy generation system (also refer as PEO power generation system, PEO method, PEO system, or PEO technology in this invention); (2) System B: the desalination system; (3) System C: the pH-swing hydration or the direct hydration system; and (4) System D: the deep ocean sediment-interstitial water carbonate sequestration system, or above ground carbonate sequestration system.

Figure 1:
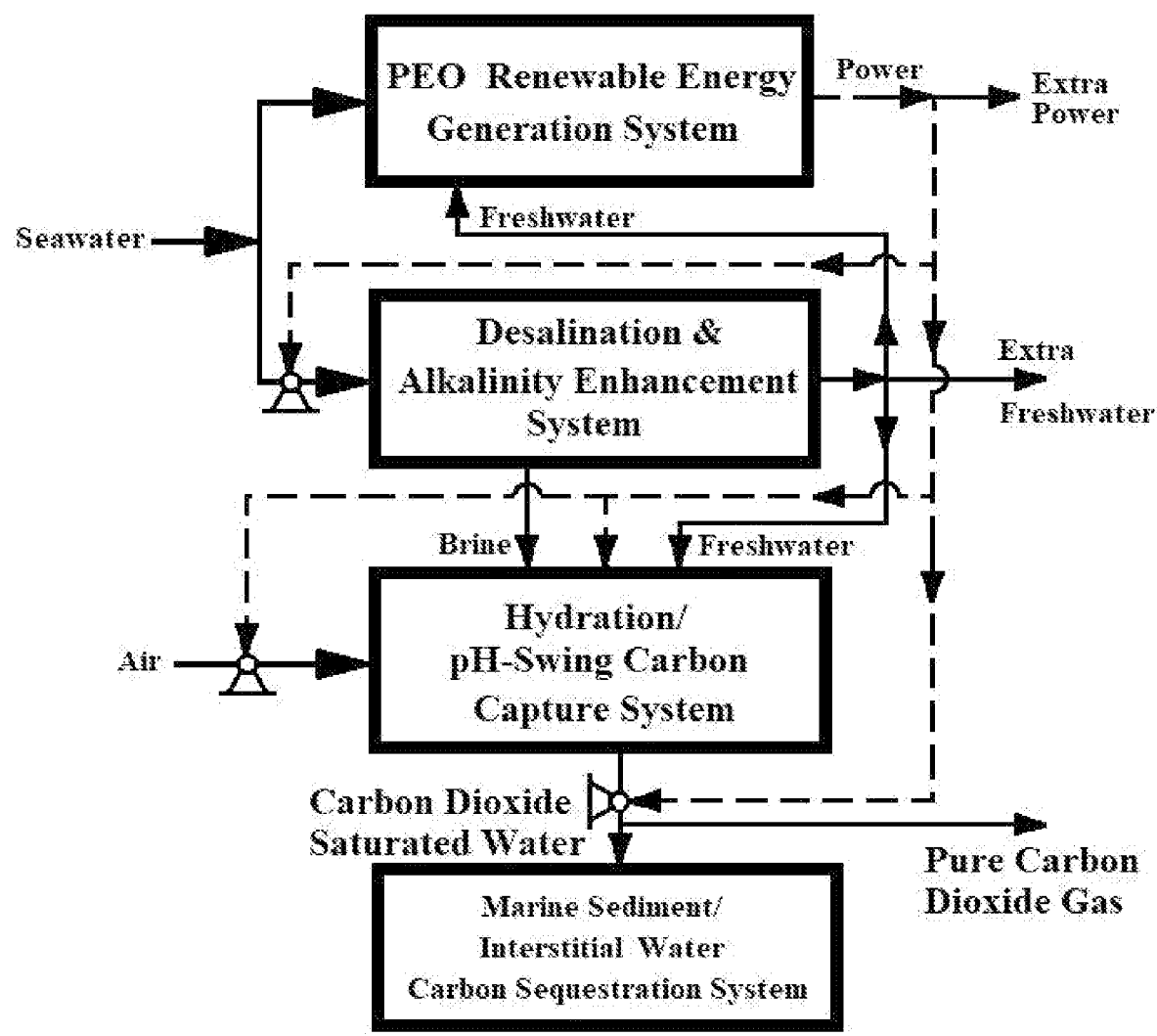
FIG. 1 is a block flow diagram showing synergistic relationships among four different systems for carbon removal in the present invention.

The method of the present invention applies these integrated self-sufficient systems, and either the "above ground" (in the terrestrial environment) or the "in the ocean" options can be selected. Application of these self-sufficient systems in the ocean environments is a major selection due to the primary input material is seawater which can be obtained in-situ for all four systems as shown in FIG. 1.

The PEO renewable energy generation system (System A) is an osmotic power generation method as disclosed in U.S. Pat. No. 11,092,141 B1. Selection of the PEO method can avoid the constraints of using the current prevailing renewable energy sources discussed above. The PEO method can generate renewable energy in-situ at the capacity needed and round the clock supply without the need for expensive energy storage and transportation systems and constraints of available area and suitable locations. Power generated by the PEO method can provide energy needed for the operation of other three systems (i.e., Systems B, C and D) discussed above and shown in FIG. 1. Extra power can be generated and sold to the utility enterprise to assist the economy of the carbon dioxide removal project.

The desalination system (System B) can provide freshwater as the feed solution needed for the PEO system (System A) operation, and the electrolysis needed for the pH-swing hydration (System C) operation to avoid generation of chlorine gas. The brine produced from the desalination operation, with higher density and alkalinity levels than that of seawater, can be used in the hydration system to assist the bicarbonate formation and denser fluid formation for sequestration. Extra freshwater generated by the desalination system can be sold to assist the economy of the carbon dioxide removal project also.

Objective of System C is to fix the collected carbon dioxide, either from ambient air or point source emissions, into mainly bicarbonate species (and minor amount into carbonate ion and carbonic acid species) by pH-swing hydration or direct hydration operations. The hydration process is conducted under pressure and at higher pH and alkalinity levels in brine or seawater so the current hydration problems discussed by the prior arts can be avoided.

The fixed carbonate species are then sequestrated into the deep-ocean sediments and potential final plume of the injected fluid is designed to below the "bioturbation layer" (usually only few meters thickness or less) by System D. The bicarbonate and carbonate species in the injection fluid are very stable in the sequestration zones within the deep-sea sediments. Any carbonic acid if present in the injection fluid can go through weathering reactions with the sediment mineral particles after sequestration to further fix the carbonic acid into bicarbonate species. As discussed above, marine sediments can provide virtually no quantification limit for the amount of carbon sequestration. In any events when the sequestrated fluid is leaked to the above seawater environment, the fixed carbonate species can still remain in the seawater as bicarbonate species without leaking back to the atmosphere as $CO_2(g)$.

Although the major operation processes as shown in FIG. 1 are provided for the ocean environment, when freshwater (including river water and/or treated wastewater) is available, the present invention can also be located above ground anywhere on earth as long as the carbon removal plant area for Systems A and C and sequestration locations (System D) can be found. Unlike other existing sequestration methods, requiring specific areas such as saline aquifers, or certain geologic environments with adequate water and depth for the $CO_2(g)$ sequestration, the fixed bicarbonate solutions of the present method can be injected to virtually any soil types (including desert soils, agricultural land soils, or prairie soils), permeable rock types or saline aquifers and virtually no depth limitations.

When freshwater is available, the desalination process can be eliminated, in both the "above ground" or "in the ocean" options. When freshwater is available, for the "above ground" option, draw solution for the PEO method can be supplied by a concentrated fluid prepared from stable and nontoxic inorganic salts including chloride or sulfate of calcium and/or magnesium, or from stable and nontoxic organic species. The draw solution can be re-concentrated and recycled so the constant supply of draw solution chemicals can be avoided. Unlike most recycling methods in the prior arts using ammonia, this invention selects the membrane filtration method using nanofiltration (NF) or ultrafiltration (UF) to conserve more energy and simplify the operation. Selection of a suitable organic draw solution with larger species particle sizes will assist the recycling of draw solution by using membrane with larger pore sizes such as ultrafiltration to conserve more energy. In this invention, fulvic acids with the molecular weight in the range of 100 to 500 can be selected to conserve energy by using ultrafiltration. When freshwater is available, for the "in the ocean" option, draw solution for the PEO method can be supplied by the available seawater so recycling of the draw solution can be avoided.

For the "in the ocean" option, Systems A, B and C can be located in a same marine bottom depth below seawater surface with or without a common enclosure structure. As discussed later in this invention, the pressure inside the reactors selected for these three systems are same as the hydraulic pressures outside the reactors, so the reactors can be located on the ocean bottom without enclosure structure, and therefore, costs of structure materials and construction can be reduced. All reactors can be controlled by remote instruments connecting to an above-ground control room located near the ocean shoreline. As shown later in this invention, the reactor depths are selected either at the optimum depth for the PEO or desalination reactors. When the depth of the optimum PEO system is selected, the extra pressure needed for reverse osmosis desalination can be supplied by a high-pressure pump with power from the PEO system. And when the depth of the reverse osmosis desalination system is selected, the lower optimum pressure needed by the PEO system can be adjusted by an energy exchanger. In the case of selecting the optimum depth of the PEO system, the forward osmosis desalination operation also can be selected, using the same draw solution chemicals and recovery method as discussed for the PEO system, as will be further discussed later with figure examples.

For the "in the ocean" option, Systems A, B and C can also be located in different marine bottom depths at its own optimum pressure needed with or without enclosure structures. However, the depth of the hydration system is selected at the same depth as the desalination system to take advantage of the high pressure already created by the desalination system. When freshwater is available, for the "in the ocean" option, the system B can be substituted by a hydraulic power facility using a penstock to divert the freshwater to the PEO system depth for extra hydraulic renewable energy generation before utilizing the freshwater as a feed solution.

If the optimum depth locations for the PEO or desalination systems are unable to find or too costly to install at the said depths, selection of depths can be varied. In these situations, when the depth (or pressure) is exceeding the optimum pressure, energy exchangers can be used to adjust to its optimum pressure. On the contrary, when the pressure is less than that of the optimum pressure, a high-pressure pump can be used to increase to the needed pressure with the power generated by the PEO system. For the PEO system, if the depth pressure is less than the required optimum level, the draw solution and recover of the draw solution can be selected similar as that of the above ground system and either seawater or freshwater can be used as the feed solution.

It is reported that approximately 16,000 operational desalination plants, located across 177 countries, are in existence. Since any existing desalination facilities already generate both freshwater and brine, in this case, portion of the freshwater (depending on the β value selected to be further explained later) and all of the brine fluid can be diverted with penstocks to the optimum PEO system depth for hydraulic power generation and subsequently used for PEO power generation and hydration purposes.

Basic principles of the four systems of the present invention are further delineated below:

The PEO renewable energy generation technology (U.S. Pat. No. 11,092,141 B1) is an improved pressure-retarded osmosis (PRO, see U.S. Pat. Nos. 3,906,250 and 4,193,267) technology which is in use now commercially. Generation of PEO energy is based on a forward osmosis operation which generating power by a semipermeable membrane which create osmotic pressure difference with a concentrated draw solution and a freshwater (or less concentrated) feed solution. The theoretical maximum osmotic pressure differential $\Delta\pi_o$ in the FO module at the static equilibrium condition can be calculated as in formula (1):

$$\Delta\pi_o = \pi_D - \pi_F \quad (1),$$

wherein $\pi_D$ is the draw solution osmotic pressure, and $\pi_F$ is the feed solution osmotic pressure, and both can be estimated by the Van't Hoff's osmotic pressure formula (2):

$$\pi = RT\Sigma M_i \quad (2),$$

and the permeate flux $Q_1$ can then be calculated by formula (3):

$$Q_i = JA \quad (3),$$

wherein A is the total area of the semipermeable membrane in the osmotic module, and J is unit permeate flux (the flowrate per unit membrane area). A membrane efficiency factor α is selected to represent the efficiency of pressure loss across the membrane. Based on the membrane efficiency the maximum effective osmotic pressure differential, $\Delta\pi_e$, can be calculated as in formula (4):

$$\Delta\pi_e = \alpha\Delta\pi_o \quad (4).$$

For a steady-state flow, a draw solution flux $Q_2$ shall be continuously input into the draw solution compartment with a hydraulic pressure $p_2$. A dilution factor β is used for the estimation of the apparent effective osmotic pressure differential as in formula (5):

$$\beta = Q_2/(Q_1+Q_2) \quad (5).$$

The effective osmotic pressure differential $\Delta\pi_\beta$ in the draw solution compartment affecting by the α and β factors can then be calculated as in formula (6):

$$\Delta\pi_\beta = \beta\Delta\pi_e = \alpha\beta\Delta 96_o \quad (6).$$

To obtain the maximum power output from an osmotic module, the optimum $p_2$ value should be selected as ½ of each corresponding $\Delta\pi_\beta$. At the optimum $p_2$ condition, $Q_1$ can be estimated by formula (7):

$$Q_1)_{optimum} = \frac{1}{2}J\beta A = \frac{1}{2}(\Delta\pi_\beta x\ tan\theta)A = \frac{1}{2}\Delta\pi_\beta(Je/\Delta\pi_e)A = 1/2\beta J_e A \quad (7).$$

When $\Delta\pi_\beta$ is selected for an osmotic module, the potential quantity of power W created by the osmotic module can be estimated by formula (8):

$$W = p_2(Q_1+Q_2) \quad (8).$$

When the optimum $p_2$ value is selected as ½ of the corresponding $\Delta\pi_\beta$, the maximum power $W_{max}$ can be generated by an osmotic module as in formula (9):

$$W_{max} = \frac{1}{2}\Delta\pi_\beta(Q_1+Q_2) \quad (9).$$

The optimum $p_2$ as discussed above can be selected as the best location depth for the "in the ocean" option for the PEO system to maximize the power generation. However, when the depth of the PEO system is selected at the same location as the desalination system, which is using a much deeper depth as discussed below, an energy exchange device using the hydraulic pressure resulted from the gravity of the seawater can be used to adjust the $p_2$ pressure to its optimum level.

Selection of the α value is depending on the commercial membranes used. The α value is usually in the range of 85% to 97%, mostly 90% to 95% for commercial membranes. For the selection of β, the range of 0.8 to 0.9 is selected to maximize the draw solution pressure. In cases of maximizing flow rates for power generation, a range of 0.7 to 0.8 also can be chosen. A turbine-generator combination is used for the power generation, where the efficiency of the existing turbine is usually around 70% and the generator is usually 70 to 85%, resulting in system efficiency about 50 to 60%. The power generated from $p_2$ pressure can then be estimated $=p_2$ pressure in m×flow rate in 1/sec×gravity in m/sec², the resulting power unit is in watt.

As shown in Equation (2) above, the osmotic pressure is temperature related. When depth is increased in the ocean, the seawater temperature is decreased. Examples of the osmotic pressure can be generated by the seawater at different temperature for a typical seawater is shown below:

| Major Composition | ppm | MW | M | Δπ at 10° C. | | | Δπ at 25° C. | | |
| --- | --- | --- | --- | --- | --- | --- | --- | --- | --- |
| | | | | Δπ (psi) | Δπ (atm) | Δπ (m) | Δπ (psi) | Δπ (atm) | Δπ (m) |
| Cl⁻ | 19810.8 | 35.5 | 0.5588 | 177.13 | 12.05 | 124.51 | 186.52 | 12.69 | 131.11 |
| Na⁺ | 11019.6 | 23.0 | 0.4793 | 151.93 | 10.34 | 106.80 | 159.98 | 10.89 | 112.46 |
| SO₄⁻² | 2764.8 | 96.1 | 0.0288 | 9.12 | 0.62 | 6.41 | 9.61 | 0.65 | 6.75 |
| Mg⁺² | 1328.4 | 24.3 | 0.0547 | 17.32 | 1.18 | 12.18 | 18.24 | 1.24 | 12.82 |
| Ca⁺² | 417.6 | 40.1 | 0.0104 | 3.30 | 0.22 | 2.32 | 3.48 | 0.24 | 2.44 |
| K⁺ | 417.6 | 39.1 | 0.0107 | 3.39 | 0.23 | 2.38 | 3.56 | 0.24 | 2.51 |
| C_T (mainly HCO₃⁻) | 147.6 | 61.0 | 0.0024 | 0.77 | 0.05 | 0.54 | 0.81 | 0.05 | 0.57 |
| Br⁻ | 68.4 | 79.9 | 0.0009 | 0.27 | 0.02 | 0.19 | 0.29 | 0.02 | 0.20 |

-continued

| Major Composition | ppm | MW | M | Δπ at 10° C. | | | Δπ at 25° C. | | |
| --- | --- | --- | --- | --- | --- | --- | --- | --- | --- |
| | | | | Δπ (psi) | Δπ (atm) | Δπ (m) | Δπ (psi) | Δπ (atm) | Δπ (m) |
| $H_3BO_3^-$ | 25.2 | 61.8 | 0.0004 | 0.13 | 0.01 | 0.09 | 0.14 | 0.01 | 0.10 |
| $Sr^{+2}$ | 14.4 | 87.6 | 0.0002 | 0.05 | 0.00 | 0.04 | 0.05 | 0.00 | 0.04 |
| Si | 4.0 | 28.1 | 0.0001 | 0.05 | 0.00 | 0.03 | 0.05 | 0.00 | 0.03 |
| Org-Carbon | 3.0 | 12.0 | 0.0003 | 0.08 | 0.01 | 0.06 | 0.08 | 0.01 | 0.06 |
| Al | 1.9 | 27.0 | 0.0001 | 0.02 | 0.00 | 0.02 | 0.02 | 0.00 | 0.02 |
| F | 1.4 | 19.0 | 0.0001 | 0.02 | 0.00 | 0.02 | 0.02 | 0.00 | 0.02 |
| $NO_3^-$ | 3.1 | 62.0 | 0.0001 | 0.02 | 0.00 | 0.01 | 0.02 | 0.00 | 0.01 |
| Org-N | 0.2 | 14.0 | 0.0000 | 0.00 | 0.00 | 0.00 | 0.00 | 0.00 | 0.00 |
| Li | 0.1 | 6.9 | 0.0000 | 0.00 | 0.00 | 0.00 | 0.01 | 0.00 | 0.00 |
| Total | 36014.4 | | 1.1465 | 363.60 | 24.74 | 255.60 | 382.88 | 26.05 | 269.15 |

The desalination system (System B) selected in this invention can be located above ground near a shoreline, or in the ocean at depths between approximately 540 m to 820 m for the supply of required pressure when a reverse osmosis desalination operation is selected, and at the depth of the optimum PEO system when a forward osmosis desalination operation is selected. For a forward osmosis operation, the type of draw solution chemicals for the desalination system can be selected similar to the PEO system as described above. The brine produced from the desalination at a typical 40% reverse osmosis recovery rate is shown below:

| Major Composition | ppm |
| --- | --- |
| $Cl^-$ | 33024.6 |
| $Na^+$ | 18369.7 |
| $SO_4^{-2}$ | 4608.9 |
| $Mg^{+2}$ | 2214.4 |
| $Ca^{+2}$ | 696.1 |
| $K^+$ | 696.1 |
| $C_T$ (mainly $HCO_3^-$) | 246.0 |
| $Br^-$ | 114.0 |
| $H3BO_3^-$ | 42.0 |
| $Sr^{+2}$ | 24.0 |
| Si | 6.6 |
| Org-Carbon | 5.0 |
| Al | 3.1 |
| F | 2.3 |
| $NO_3^-$ | 5.2 |
| Org-N | 0.3 |
| Li | 0.2 |
| Total | 60036.0 |

The above data show that the density of fluid is increased from 1036 g/l of seawater to 1060 g/l of brine and alkalinity can be enhanced about 1.67 times. Therefore, selection of the brine fluid from desalination can enhance the hydration of $CO_2(g)$, and due to the heavier brine used for hydration the stability of the hydrated fluid also can be enhanced by storing in the interstitial water in the marine sediments.

As discussed previously, all existing desalination plants can be converted to an integrated desalination and PEO energy generation facilities for carbon dioxide removal and extra power generation. The β value selected for the PEO system is usually in the range of 0.8 to 0.9, so only 10 to 20% of the freshwater produced by the desalination plant is enough to be used as the feed solution for the PEO power generation. All the brine produced by the desalination facilities can be used by the PEO system as draw solution. Penstocks for both the freshwater and brine can be installed to the optimum depth of the PEO system, and before using the both freshwater and brine as the feed and draw solution, sets of turbine-generator can be used for extra hydraulic power generation. The final brine fluid generated can be also used in subsequent hydration and sequestration systems to discharge brine and sequester carbon dioxide. By doing above, the current problems of expensive power costs, brine discharge impacts to marine life for the existing desalination facilities, and carbon sequestration to solve the global warming can be all achieved.

Two types of hydration system (System C) are disclosed in this invention for carbon dioxide removal operation: direct hydration and pH-swing hydration. Direct hydration is to hydrate the $CO_2(g)$ into $CO_2(aq)$ and $H_2CO_3(aq)$ (carbonic acid) and further converting to $HCO_3^-$ (bicarbonate), as shown in the following equations (10) to (13):

$$CO_2(g) + H_2O \leftrightharpoons CO_2(aq) + H_2O \quad (10);$$

$$CO_2(aq) + H_2O \leftrightharpoons H_2CO_3^* \quad (11);$$

$$H_2CO_3^* \leftrightharpoons HCO_3^- + H^+ \quad (12); \text{ and}$$

$$HCO_3^- \leftrightharpoons CO_3^{-2} + H^+ \quad (13).$$

Equation (10) above expresses the Henry's Law for the dissolution of gases. The concentration of $CO_2(aq)$ can be calculated from the Henry's Law as in formula (14):

$$c = pK_h \quad (14),$$

wherein $K_h$ is the Henry's Constant, at the seawater condition 10° C., $K_h$=0.04571 (M/atm) and at 25° C.=0.02950 (M/atm) for dissolution of $CO_2(g)$, and for comparison, in the freshwater condition at 10° C., $K_h$=0.05370 (M/atm) and at 25° C.=0.03388 (M/atm) for dissolution of $CO_2(g)$; and p is the partial pressure of $CO_2(g)$ in atm in this case, and c is the solubility concentration of $CO_2(aq)$ in M. The $CO_2(g)$ concentration in the current ambient air is about 412 ppm (by volume), means the partial pressure is only about 0.0412 atm, which is considered insufficient for the fixation of $CO_2(g)$ by a direct hydration method. To increase the hydration concentration of $CO_2(g)$, this invention increase the direct hydration pressure to that of the desalination reverse osmosis pressure so the hydration efficiency can be greatly increased, and both desalination and hydration systems can also be located in the same depths when a "in the ocean" option is selected.

The $CO_2(g)$ dissolution rates of the above Equation (10) is very rapid; however, Equation (11) is relatively slow, resulting in the formed $H_2CO_3^*$ (i.e., $CO_2(aq) + H_2CO_3(aq)$) containing mainly $CO_2(aq)$ (about 99%). Reaction rate of Equations (12) and (13) are also very rapid. In the equilibrium conditions, reaction constants for Equations (12) and (13), i.e., $K_1$ and $K_2$, selected in this invention for evaluation are: in the seawater, $K_1=10^{-6.08}$ (at 10° C.) and $=10^{-6.00}$ (at 25° C.), an $K_2=10^{-9.28}$ (at 10° C.) and $=10^{-9.10}$ (at 25° C.). For comparison, in the freshwater condition at 10° C., $K_1=10^{-6.464}$, at 25° C., $K_1=10^{-6.352}$, and at 10° C., $K_2=10^{-10.490}$, at 25° C., $K_2=10^{-10.329}$.

Reaction rate is important for the hydration reactor design. The overall reaction rate of direct hydration can be shown in equation (15):

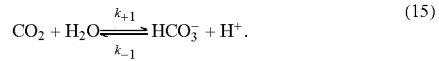

(15)

The rate constant of $k_{+1}$ is about $3.71\times10^{-2}s^{-1}$. To reach the saturation condition for $CO_2(g)$ direct hydration will need approximately 100 sec. In order to enhance the hydration, a specially designed pH-swing hydration method is proposed in this invention. In the pH-swing hydration reactions, $CO_2(aq)$ can react with hydroxide ions directly. Therefore, the above-mentioned Equations (10) to (12) can be replaced by the following equation (16):

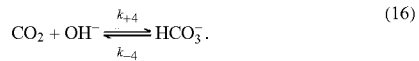

(16)

The rate constant of $k_{+4}$ is about $2.23\times10^3$ $[OH^-]s^{-1}$. As shown above, at pH=11, i.e., select pH at 3 units of swing value in a seawater condition from pH 8 to 11, the hydration rate for pH-swing comparing to that of direct hydration is about 60 times faster, means, only 1.67 sec is needed for pH-swing hydration comparing to 100 sec for direct hydration. In this situation, the bicarbonate concentration also can be increased about 1000 times (i.e., pOH changes from about 6 to 3, so bicarbonate concentration increases $10^{-3}/10^{-6}=1000$ times). No. of pH swing values required for this invention is based on the $CO_2(aq)$ fixation at $pH>pK_2$, to ensure an effective conversion of $CO_2(aq)$ to $HCO_3^-$.

As shown in the pH-swing reactor of the present invention, a unique separation plate is developed to avoid using ionic membranes or exchangers for controlling migration of ionic species, and a modified venturi design to combine electrolytes away from the anode to prevent the chlorine gas generation. Two fluid zones in the pH-swing reactor are separated by a plate, where zone A (the cathodic zone) is injected in with the brine from the desalination operation for the "in the ocean" option, or with freshwater for the "above ground" option, and with a compressor to collect and inject into the zone A with an air stream containing $CO_2(g)$. In the pH-swing operation, the $CO_2(g)$ can be fixed into $HCO_3^-$ directly, as shown below in zone A in accordance with the following equation (17):

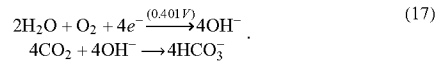

(17)

A freshwater stream is pumping into Zone B (the anodic zone) for the following reaction in equation (18) to complete the electron circuit of the hydration reactor:

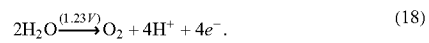

(18)

For electron neutrality and electron circulation in circuit, the molar concentration of $[OH^-]$ and $[H^+]$ in above Zones A and B, respectively are equals and fluids in these two zones are mixed together by a special pH-swing reactor design as discussed later in this report.

The sequestration system (System D) for the "in the ocean" option, or for the "above ground" option located near the ocean, the fixed hydrated carbonate species (mainly $HCO_3^-$, and some minor amount of $CO_3^{-2}$ and $H_2CO_3$) can be injected into the sediments in a continental shelf, a continental slope or a continental rise area. The injection depth is selected at several hundreds or even thousands of meters below the sediment surface. The estimated top boundary of a final injection plume is selected at least ten meters below the "bioturbation layer" to prevent impacts to any marine life living on or in the sediments. The minor amount of carbonic acid (i.e., $H_2CO_3$) injected into the sediments can further react with the sediment mineral particles to further fix the carbon species and enhance the alkalinity generation through common weathering reactions as shown below:

carbonate, oxide or hydroxide minerals+carbonic acid→bicarbonate+cations (19); silicate minerals+carbonic acid→bicarbonate+cations+clay minerals or siliceous acid (20).

When the "above ground" option and terrestrial sequestration is selected, the carbon dioxide removal sequestration can be injected into soils (including desert soils, agricultural soils, prairie soils), permeable rock formations or saline aquifers with the carbonate solution produced by the System C. In the above ground option without the use of seawater or brine as the hydration fluid, the high level of carbonic acid formed in the carbonate solution, after sequestration, will go through the weathering reactions as shown above and further fix the carbonate species. Since the carbonate solution already containing water, unlike most conventional $CO_2(g)$ sequestration which require water and sometimes alkaline conditions for carbon dioxide removal sequestration. If the carbon dioxide utilization option is selected in this invention, as will be further discussed later, the bicarbonate fluid fixed in the cathodic zone A can be diverted into the anodic zone B to convert the carbonate species back to $CO_2(g)$ and the concentrated $CO_2(g)$ stream can be collected for utilization.

2. Process Flow Diagrams (PFD), Design Options, and Process and Instrument/Equipment Diagrams (P&ID)

Based on the four-system arrangements discussed above, self-sufficient systems for carbon dioxide removal which do not require renewable energy and special chemicals from outside the project locations can be achieved. Examples of process flow diagrams are provided to show the energy and materials flow into and out of the four systems, as well as through the project boundary. These energy and materials are obtained and generated in-situ so none of them are required to be imported from outside. Inside the four disclosed systems, many unit processes are applied to complete the self-sufficient operation objective of the method of the present invention. Based on the principles delineated above, self-sufficient systems for the carbon dioxide removal in the present invention may have many embodiments based on variation of the selected unit processes.

The present invention are further illustrated in the following embodiments with a wide range of design options.

In the first embodiment of the present invention, an Above Ground option with in-situ PEO renewable energy generation (System A) and reverse osmosis desalination (System B) is provided.

In the second embodiment of the present invention, an Above Ground option with in-situ PEO renewable energy generation (System A) and forward osmosis desalination (System B) is provided.

In the third embodiment of the present invention, an Above Ground option when freshwater is available (and thus, desalination process can be avoided) is provided.

In the fourth embodiment of the present invention, an In the Ocean Option with gravity for the pressurized seawater input to both PEO System and Desalination System is provided.

In the fifth embodiment of the present inventin, an In the Ocean Option with available freshwater for both hydraulic power generation and PEO Energy generation is provided.

In the sixth embodiment of the present inventin, an In the Ocean Option with different depth locations for Systems A, B and C is provided. Location for System A can be situated at the optimum depth for PEO draw solution pressure, and location for Systems B and C can be arranged at suitable depths for the desalination pressure needed.

In the seventh embodiment of the present invention, an In the Ocean Option with same depth location for Systems A, B and C is provided. All Systems can be located at the same depth, either at the optimum PEO depth or suitable depths for the required desalination pressure, or any suitable depths as discussed previously. All Systems A, B and C can be arranged without an enclosure structure.

Figure 2A:
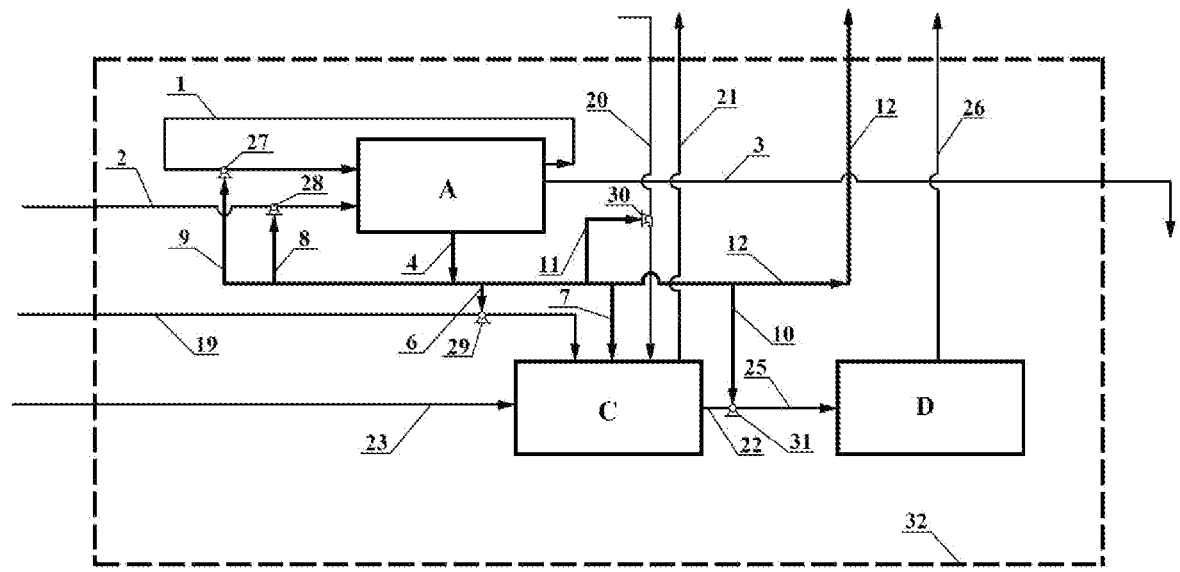
FIGS. 2A to 2C show three examples of process flow diagrams of the method in the present invention, where
Figure 2B:
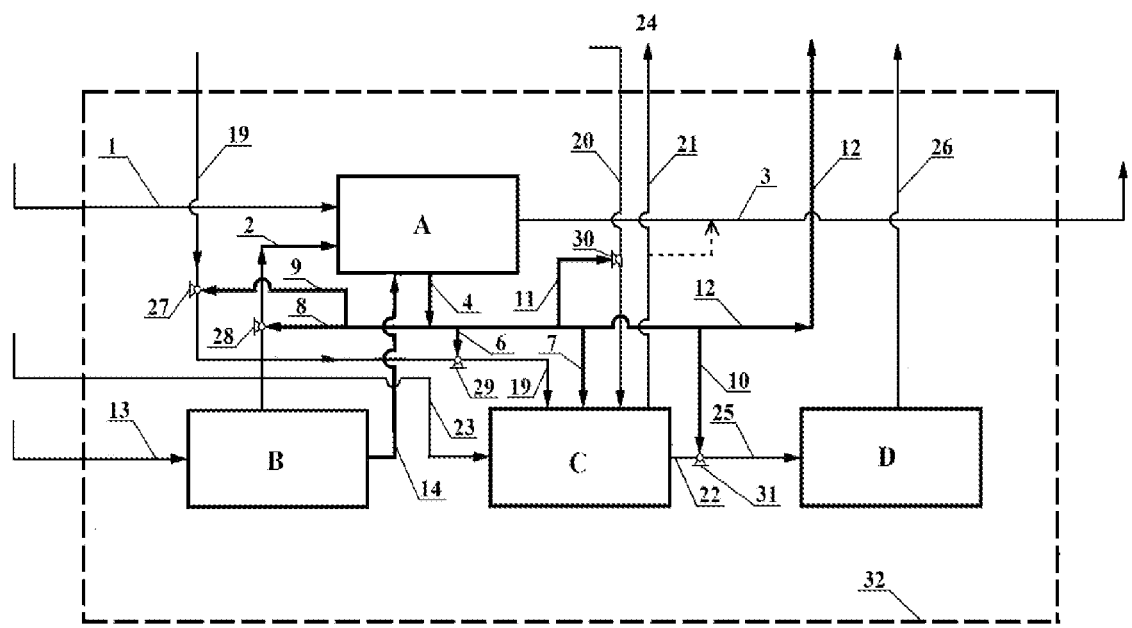
Figure 2C:
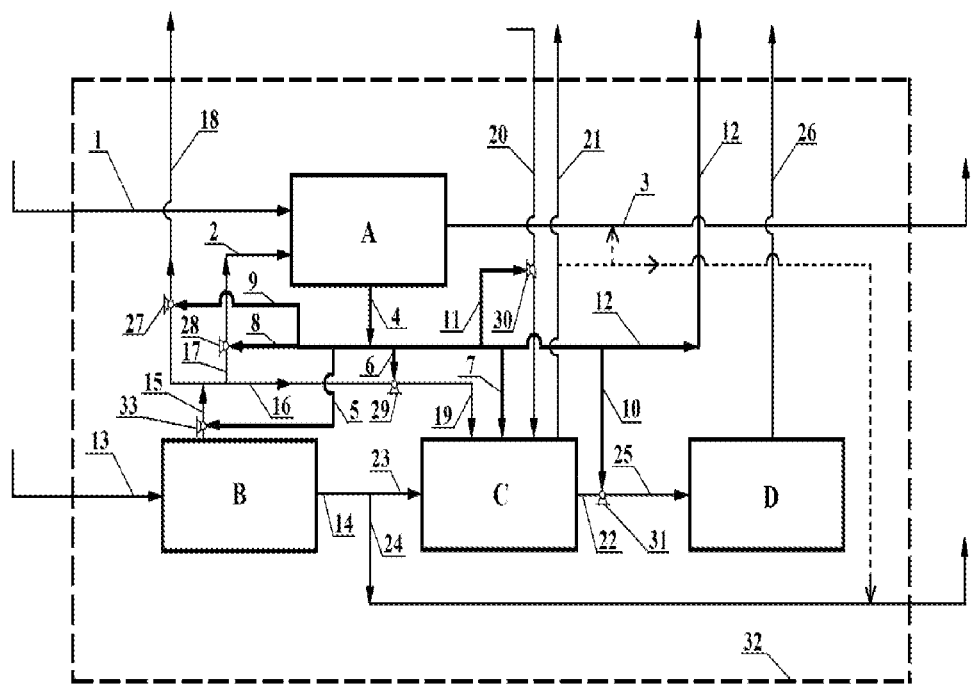

Three process flow diagrams shown respectively in FIGS. 2A, 2B and 2C are the third, fifth, and sixth embodiments of the present invention to show how the energy and needed materials can be produced and utilized synergistically by the four systems inside the project boundary 32. The stream and equipment identification numbers in FIGS. 2A, 2B, and 3D are explained below with the reference numbers:

1 is draw solution of System A (PEO system), wherein, in FIGS. 2B and 2C this draw solution is representing a seawater intake stream and in FIG. 2A representing a recycling of a concentrated draw solution stream. 2 is freshwater input stream as the feed solution for the System A (PEO system). 3 is diluted draw solution output stream, which for FIGS. 2B and 2C is diluted seawater streams. 4 is the total renewable power generation. 5 is power supply to the desalination system as shown in FIG. 2C for water pump 33. 6 is power supply to water pump 29 for freshwater input to System C. 7 is power consumption for pH-swing hydration. 8 is power supply to pump 28 for freshwater pumping to the PEO system. 9 is power supply to pump 27 for the draw solution recirculation in FIG. 2A or freshwater pumping in FIGS. 2B and 2C. 10 is power supply to hydraulic compressor 31 for bicarbonate fluid injection. 11 is power supply to air compressor 30 for ambient air (or point source emission) intake to System C. 12 is extra power generated for sale. 13 is freshwater intake stream to System B of FIG. 2B for hydraulic power generation; or seawater intake stream to System B of FIG. 2C for desalination. 14 is hydraulic power generation in FIG. 2B or brine production in FIG. 2C of System B (as discussed above, when freshwater is available, System B can be converted to a hydraulic power generation system). 15 is total freshwater output from desalination in FIG. 2C. 16 is freshwater output to the pH-swing system in FIG. 2C. 17 is freshwater output to the PEO system in FIG. 2C. 18 is extra freshwater for sale in FIG. 2C. 19 is freshwater input to the pH-swing system (System C). 20 is ambient air (or point source emission) intake to the pH-swing system. 21 is waste air discharge from the pH-swing system (where a broken line shows portion of the waste air can be used to reduce the density of a discharge fluid to expedite the fluid discharge). 22 is fixed bicarbonate stream output. 23 is seawater intake to the pH-swing system in FIGS. 2A and 2B and brine intake to the pH-swing system in FIG. 2C. 24 is extra brine discharge, with enhanced alkalinity in FIG. 2C. 25 is fixed bicarbonate stream injection. 26 is $CO_2$ leakage stream.

Based on principles and data provided above, quantity values for all of the streams delineated above can be calculated. For example, for the fifth embodiment design option as shown in FIG. 2B, in order to remove 1 M t/y carbon dioxide, when $\beta=0.9$, $\alpha=95\%$, $p_2=1/2\Delta\pi_\beta$, seawater conditions provided above, and at a selected power output of $1.2\times10^7$ kw from a PEO system (Stream #4) are selected, the following data can be calculated: Stream #1 $=6.59\times10^7$ m³/hr, Stream #2=$7.33\times10^6$ m³/hr, Stream #3=$7.33\times10^7$ m³/hr, Stream #5=0 kw, Stream #6 =$4.89\times10^4$ kw, Stream #7=$1.48\times10^5$ kw, Stream #8=0 kw, Stream #9=0 kw, Stream #10=6061 kw, Stream #11=$6.09\times10^6$ kw, total extra power generated (Stream #12)=$6.91\times10^6$ kw, and extra hydraulic power generated (Stream #14)=$1.2\times10^6$ kw. Some of the streams shown above as 0 kw is due to energy exchange at a deep seawater environment where no power is needed from the PEO system. As shown above of the Stream #12 result, the extra power generated can be sold to assist the economy of the project, which means that the present invention for carbon dioxide removal can actually generate profit during operation when the value for Stream #4 is properly selected. This situation is not found for any of the existing arts proposed for carbon dioxide removal operation.

Figure 3:
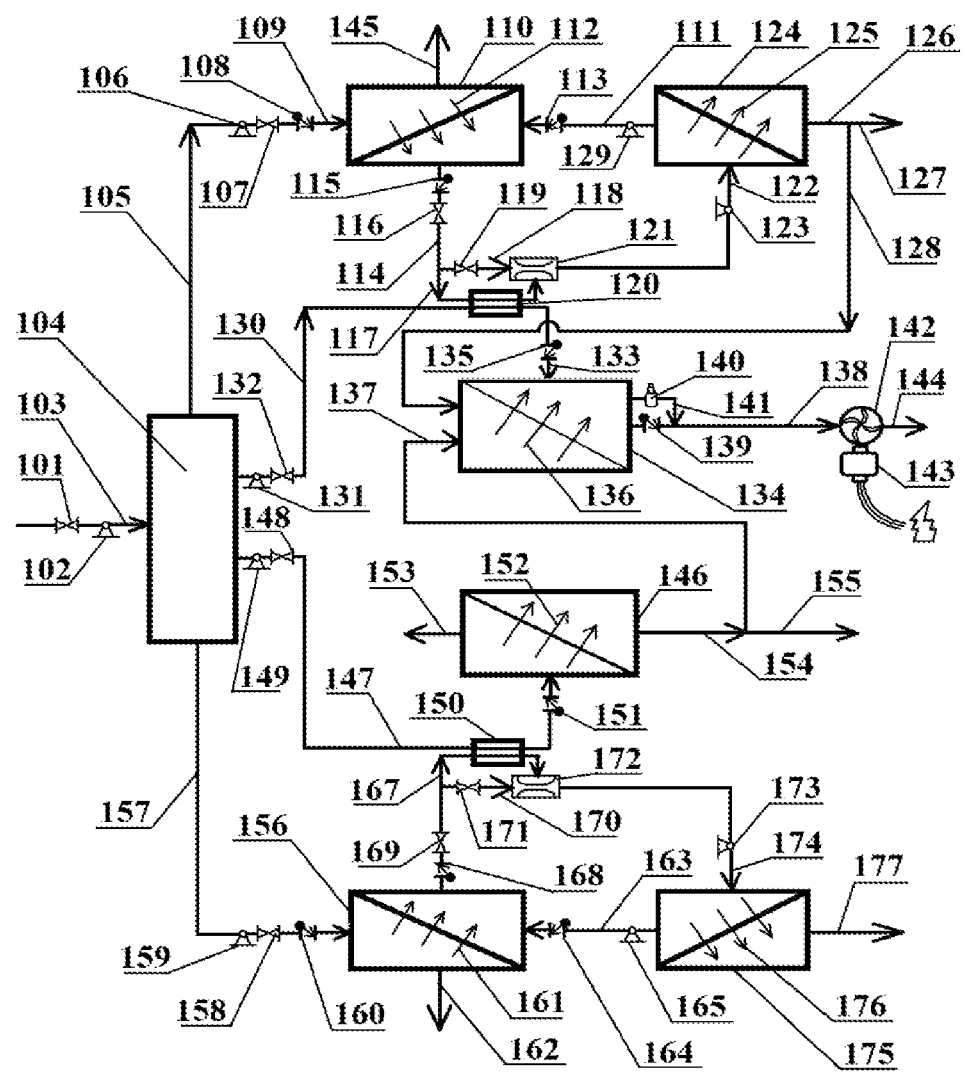
FIG. 3 is a detailed process and instrument/equipment diagram showing synergy between PEO renewable energy generation and desalination systems for an "above ground" option where reverse osmosis (RO) is used for the desalination system in the present invention.

The detailed unit processes and instruments/equipment used in each design option mentioned above are shown in FIGS. 3 to 9. FIG. 3 (i.e., Design Option #1) is a detailed process and instrument/equipment diagram showing the synergy between the PEO energy generation and desalination systems (located near the ocean) for an "above ground" option where RO (reverse osmosis) is used for the desalination system. In FIG. 3, seawater 103 is pumped by a pump 102 with a flow control valve 101 to a filtration and storage facility 104. The filtered seawater is separated into four streams, i.e., streams 105, 130, 147, and 157 for different purposes as discussed below. Stream 105 (after pumping operation it is also called Stream 109), is supply to a PEO module 110 for a FO operation, using a pump 106, a control valve 107 and a check valve 108 to prevent backflow and maintain a steady-state flow condition. Details of the PEO module design will be further discussed later in this invention. A draw solution 111 is provided to the PEO module 110 using FO operation to create a permeate flow 112 and forming a brine stream 145. The brine stream 145 can be used in the hydration system (System C) for fixing $CO_2$. A high pressure diluted solution 114 generated and controlled by a valve 116 and a check valve 115, is broken down into two flows, one flow 117 is used to enhance the pressure of a stream 130 by an energy exchanger 120. Another stream 118, controlled by a valve 119, through a modified venturi device to recombine the flow 117, in order to concentrate and recycle the draw solution by a NF or UF module 124. A permeate flow 125 created by the module 124, will form a flow 126, which is a treated freshwater and can be recovered for sale (Stream 127), and/or supplied to another PEO module 134 as a feed solution for power generation. In this case, a draw solution 133 is pressurized by the pressure exchanger 120, using check valves 135, and 139 to control the flow in a steady condition. A pressure relieve valve 140 is provided to control the PEO module in a steady condition. The freshwater needed by the PEO module 134 is also supplied by a RO desalination module 146 which is generation a freshwater stream 154, and portion of the freshwater stream from stream 154, i.e., stream 137, can be used for the PEO module 134. In the PEO module 134, a created permeate flow 136 is mixing with the draw solution 133 to create a high-pressure stream 138 to rotate a turbine 142 and using a generator 143 to generate power. Power generated can be supplied to other systems (Systems B, C, and D) for utilization. As shown above, extra power generated can be sold for a profit to assist the carbon dioxide removal project economy. A waste stream 144 from the power generation can be discharged to the ocean. In the RO desalination module 146, the seawater stream 147 is pressure enhanced by another energy exchanger 150 for the desalination. Extra freshwater stream 155, generated by the RO desalination module 146, can also be sold for a profit to assist the carbon dioxide removal project economy. A brine stream 153 is generated and is used for the hydration system (System C) as will be further discussed later in this report. Similar to that of the above combination of the PEO module 110 and the NF or UF 124 forming a loop to recover the draw solution and gain the high-pressure stream by an energy exchanger, in this situation, a PEO FO module 156, and a NF/UF 175 are used. Auxiliary equipment, such as a modified venturi 172, pumps 159, 165 and 173, valves 158, 169, and 171, check valves 160, 164, and 168 are also used. Streams 163, 167, 170, 174, 161, and 176 are created similar to that discussed above. Again, a brine stream 162 produced is used for the hydration system, and a freshwater stream 177 produced can be sold for profit also.

Figure 4:
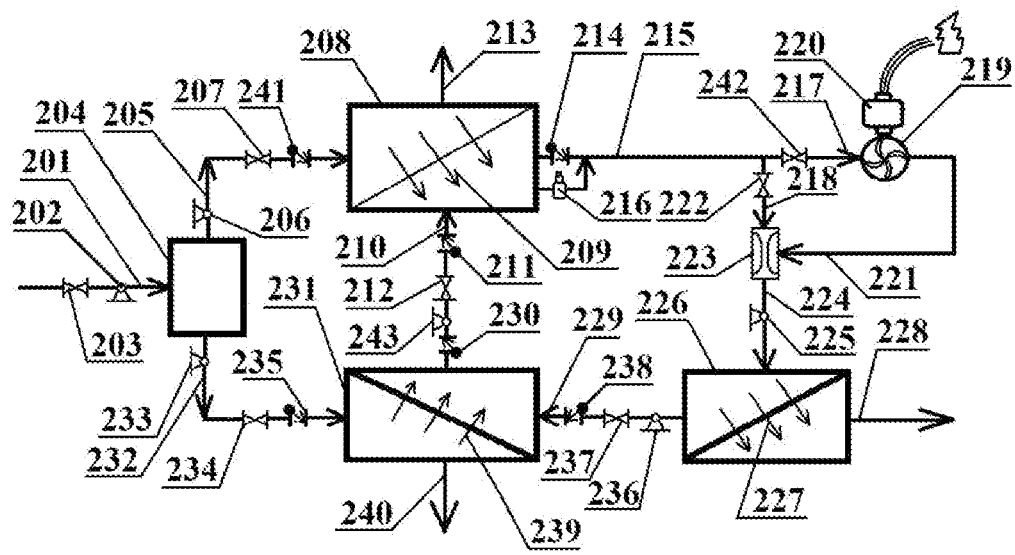
FIG. 4 is a process and instrument/equipment diagram showing synergy between PEO renewable energy generation and desalination systems for an "above ground" option where forward osmosis (FO) is used for the desalination system in the present invention.

FIG. 4 shows details of the second embodiment of the design option which is an above ground option. The second design option is a simplified design of the first design option and is using a PEO module 208 to generate power and a brine stream 213 for hydration, using a FO module 231 to generate a brine stream 240 for the hydration system and a pressurized stream 210 as a draw solution for the PEO module 208, and using a NF/UF 226 for the recovery and recirculation of a draw solution 229 as a draw solution for FO module 231 and generating a freshwater stream 228 for recovery (for sale) or discharge. Seawater stream 201 is filtered and stored in the filtration facility 204. Again, auxiliary pumps 202, 206, 233, 243, 225, and 236, auxiliary control valves 203, 207, 234, 212, 222, 242, and 236, as well as auxiliary check valves 241, 214, 235, and 238 are provided for the second design option to maintain the flow in a steady state continuous flow condition so the overall system will work. A pressurized stream 217 to push a turbine 219 and a generator 220 to generate power for the subject design option and other systems (Systems C and D) to use, and extra energy can be arranged for sale also.

Figure 5:
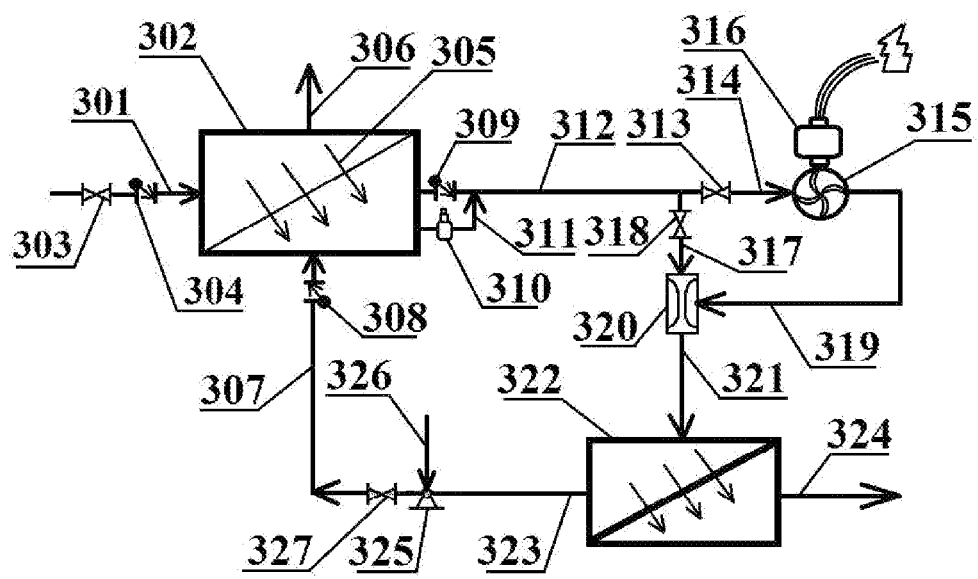
FIG. 5 is a process and instrument/equipment diagram showing an "above ground" PEO renewable energy generation system when freshwater is available in the present invention.

The process and instruction diagram of the third embodiment of the design option is shown in FIG. 5. The embodiment is a simplified second embodiment of the design option of an above ground option when freshwater 301 is available to be used as a feed solution for the PEO module 302. Either river water or treated wastewater can be used so no desalination (System B) is needed. Due to this situation, this design option can be used anywhere in the terrestrial environment as long as a carbon dioxide removal plant location is available, and sequestration areas are available and nearby. Concentration and type of soluble salts or organic species as discussed above are selected for a draw solution 307 for the PEO module 302 to create a permeate flow 305.

A flushing solution 306 can be used for the pH-swing system. The diluted draw solution 312 is separated into two streams 314 and 317, where stream 314 is used for the power generation by a combination of a turbine 315 and a generator 316, and stream 317 is flow through a modified venturi 320 to recombine the stream 319 after power generation. The combined stream 321 is reconcentrated and recycled by a NF/UF module to recover the draw solution 323 similar to that discussed above. A pump 325 is used to increase the desirable pressure of the draw solution 307 to the PEO module 302, by a power supply 326 generated from the power generation facility discussed. In this design option, again, necessary auxiliary equipment such as valves 303, 313, and 327, and check valves 304, 309, and 308, as well as a pressure relief valve 310 is provided to maintain the system operation.

Figure 6:
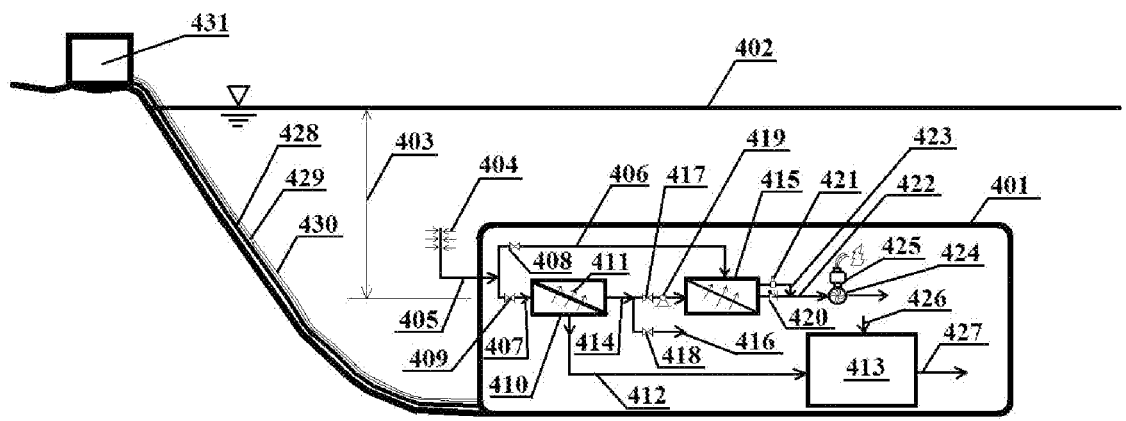
FIG. 6 shows the self-sufficient carbon removal method using seawater and gravity synergy effects with all related systems within an enclosure structure in the ocean in the present invention.

FIG. 6 shows the process and instrument diagram of the fourth embodiment of the design option, in which Systems A (i.e., PEO module 415), System B (i.e., RO module 410) and System C (i.e., hydration reactor 413) are located in the ocean at a depth 403 with an enclosure structure 401. The depth of the enclosure structure 401 can be selected at the optimum depth (i.e., $p_2=\frac{1}{2}\Delta\pi_\beta=\frac{1}{2}\alpha\beta\Delta\pi_o$ of the System A 415 or between 540 m to 820 m for the supply of required hydraulic pressure of the RO module 410. When $p_2$ hydraulic pressure is selected, the insufficient pressure for the RO operation can be augmented by the power generated by the System A with the power generation equipment of a turbine 424 and a generator 425. As discussed previously, a brine stream 412 generated by the RO module 410 can be used for the hydration reactor 413 to assist the hydration operation and increase the density of hydrated stream 427 for $CO_2$ sequestration. A freshwater stream 414 can be used as a feed solution for PEO module 415, and also for the hydration reactor 413, as shown in streams 416. An air stream 426 can be withdrawn from ambient air (or a point emission source containing $CO_2$) through a pipeline 430. Any extra freshwater produced can be recovered through a pipeline 428, to a control room 431 located above ground. Extra power generated also can be transmitted through a powerline 429 to the above ground electrical substation. Again, necessary auxiliary equipment are provided similar to that discussed previously. All instruments/equipment used can be controlled remotely in the control room 431 through electrical lines (not shown).

Figure 7:
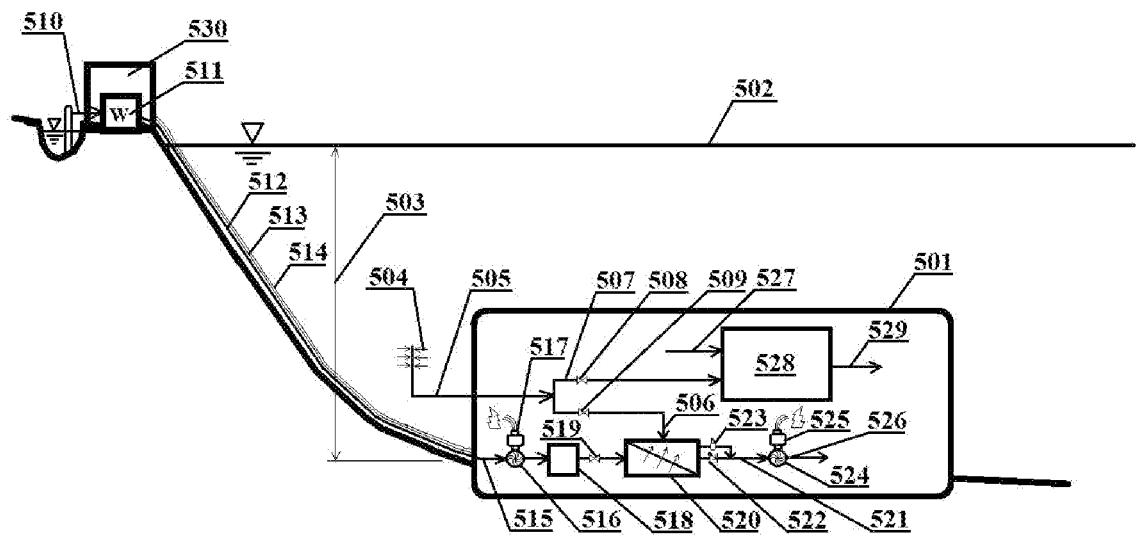
FIG. 7 shows the self-sufficient carbon removal method using freshwater and gravity synergy effects with all related systems within an enclosure structure in the ocean in the present invention.

Similar to that of FIG. 6 (the fourth embodiment of the design option), the fifth embodiment of the design option as shown in FIG. 7 can be also located in the ocean with an enclosure at a depth 503. However, the fifth design option is selected when the freshwater supply 510 is available, so a desalination system is not required, and therefore, the depth 503 can be selected at the optimum depth for PEO module 520 (i.e., $p_2\frac{1}{2}\Delta\pi_\beta=\frac{1}{2}\alpha\beta\Delta\pi_o$). The freshwater (either river water or treated wastewater) 510 is treated by a filtration facility 511 and supply by penstock 512. Since the freshwater elevation is also similar to that of the PEO optimum depth of 503, so extra hydraulic power generation can be arranged as shown by turbine 516, generator 517. After hydraulic power generation, the freshwater pressure is released and can be stored in an equalization tank 519, pressure of the freshwater in the equalization tank is just fitted for the input as the feed solution 519 for the PEO module 520. A seawater input stream 504, with the pressure similar to hydraulic pressure of 503, is withdrawn from outside the enclosure structure 501 to both the PEO module (shown as 506 as a draw solution) and the hydration reactor 526 (shown as 507). Again, the diluted draw solution stream 521 with elevated pressure to be used for another power generation set of turbine 524 and generator 525. After power generation the diluted seawater stream 526 can be discharged to the ocean with a modified venturi and with aid from waste air generated from the hydration reactor (not shown) to reduce the density of the discharge fluid for release of the diluted seawater stream. An ambient air (or point source emission containing $CO_2$) is withdrawn through pipeline 513, and air stream 527 is pumped into hydration reactor 528 to fix the $CO_2$ into bicarbonates loaded stream 529 for sequestration. Again, associated auxiliary equipment shown in the figure are needed for the PEO module and the hydration reactor as discussed above.

Figure 8:
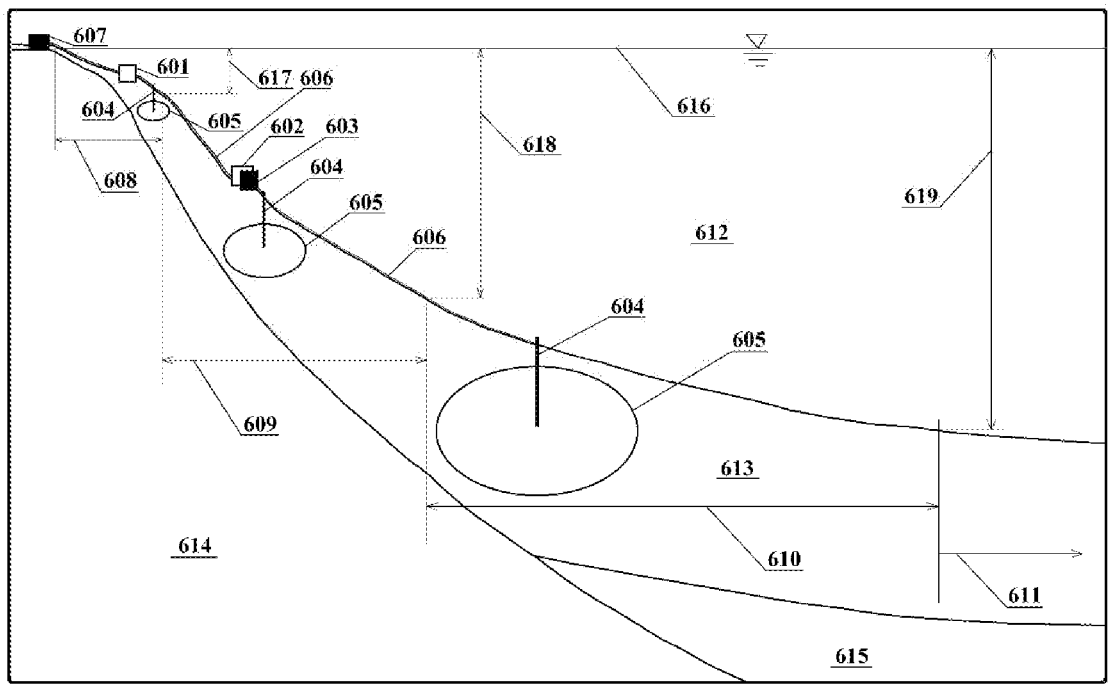
FIG. 8 shows one embodiment of the present invention having an "in the ocean" option without enclosure structure for carbon removal with different depths for the related systems.

FIG. 8 shows the process and instrument diagram of the sixth embodiment of the design option, which is an example of an "in the ocean" option without enclosure structure for carbon removal with different depths for the related systems. In the design option, PEO System 601 is located at a depth equivalent to the optimum $p_2$ pressure (i.e., $p_2=\frac{1}{2}\Delta\pi_\beta=\frac{1}{2}\alpha\beta\Delta\pi_o$) and RO desalination system 602 (System B) and hydration system 603 (System C) can be located at a depth in the range of 540 m to 820 m as shown above. An injection well 604 of a sequestration location 605 can be arranged at a suitable depth with sufficient space for storage of the fixed bicarbonate fluid through a pipeline 606 in marine sediments 613, above a continental crust 614 and oceanic crust formation 615, in continental shelf 608, continental slope 609, or continental rise 610 areas. The depths for a typical continental shelf 617 are approximately 0 to 200 m depth from the seawater surface 616. For the depths of a typical continental slope 618 are 200 to 2000 m, and for the depths of a typical continental rise 619 are 2000 to 3000 m. An abyssal plain area 611 also can be selected but require more costs to install and operate the sequestration system. A control room 607 can be located above ground near the shoreline area as shown in FIG. 8. Seawater 612 is used as a draw solution for the PEO system 601, and as a feed solution for the RO desalination system 602.

Figure 9:
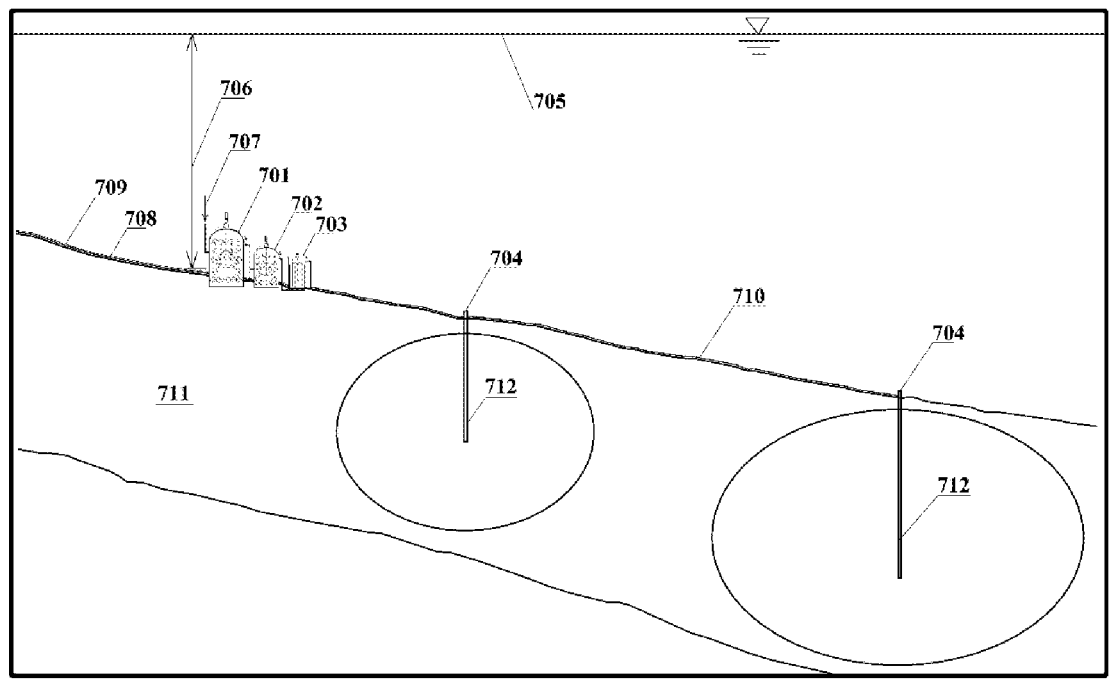
FIG. 9 shows another embodiment of the present invention having an "in the ocean" option without enclosure structure for carbon removal with same depth for the desalination, PEO renewable energy generation, and pH-swing systems.

FIG. 9 is a schematic diagram showing the seventh embodiment of the design option, i.e., "in the ocean" option with same depth location for System A 702, System B 701, and System C 703 without an enclosure structure. Due to the pressure within and outside the reactors of Systems A, B and C are the same, so metallic construction materials (which are usually subject to a corrosion problem) may be replaced by a high strength plastic material such as FRP material to reduce costs. All Systems can be located at the same depth, either at the optimum PEO depth (i.e., $p_2=\frac{1}{2}\Delta\pi_\beta=\frac{1}{2}\alpha\beta\Delta\pi_o$) or suitable depths for the required RO desalination pressure (i.e., between 540 m to 820 m depths) for the supply of required hydraulic pressure based on gravity of seawater depth 706 from seawater surface 705. Again, $CO_2$ injection pipelines 710, and injection wells 704 in sequestration areas 712 can be selected at suitable locations in marine sediments 711. A control room (not shown) can be located above ground similar to that of FIG. 8.

3. Equipment Design and Operation Explanation

Based on the above process flow diagrams (PFD) and process and instrument/equipment diagrams (P&ID), specially designed apparatus (reactors) are used to achieve the objectives. The System A is using the PEO module (as shown in FIGS. 10A to 10C) disclosed in U.S. Pat. No. 11,092,141 B1. The conventional FO module is unable to achieve the objective for a steady and continuous power generation. In the proposed PEO module 801, tubular FO modules 802 are selected which comprise multiple tubular FO membranes 803 enclosed in a porous tubular casing 804 with openings 804. Feed solution 806 is entering to the tubular FO module 802 and exiting the module as shown in 807. A draw solution 808 is entering into the PEO module 801, which provides turbine mixers 817 and propeller mixers 818 to homogenize the concentration of the draw solution at all times to prevent unsteady flow conditions. For the "in the ocean" option, the draw solution may come from the seawater, or the brine produced by the RO desalination (System B). For the "above ground" option, the draw solution can be selected from high concentration stable salts or organic species as discussed previously in this report. In the PEO module 801, auxiliary equipment such as pumps 809, and 819, pressure gauge 812, valve 810, check valves 811 and 814, pressure relief valve 815 are provided to control the required conditions for processing. The resulting outflow 813 (and 816, if happened) can be reconcentrated and recovered by a nanofiltration/ultrafiltration as discussed previously for the "above ground" option. For the "in the ocean " option, the outflow 813 can be discharged into the seawater environment or to the System C for hydration purpose.

For the System B, the desalination module, any conventional RO desalination modules can be selected. However, when FO operation is selected for desalination, the PEO module can also be used, as discussed above in the related design options.

Figure 11A:
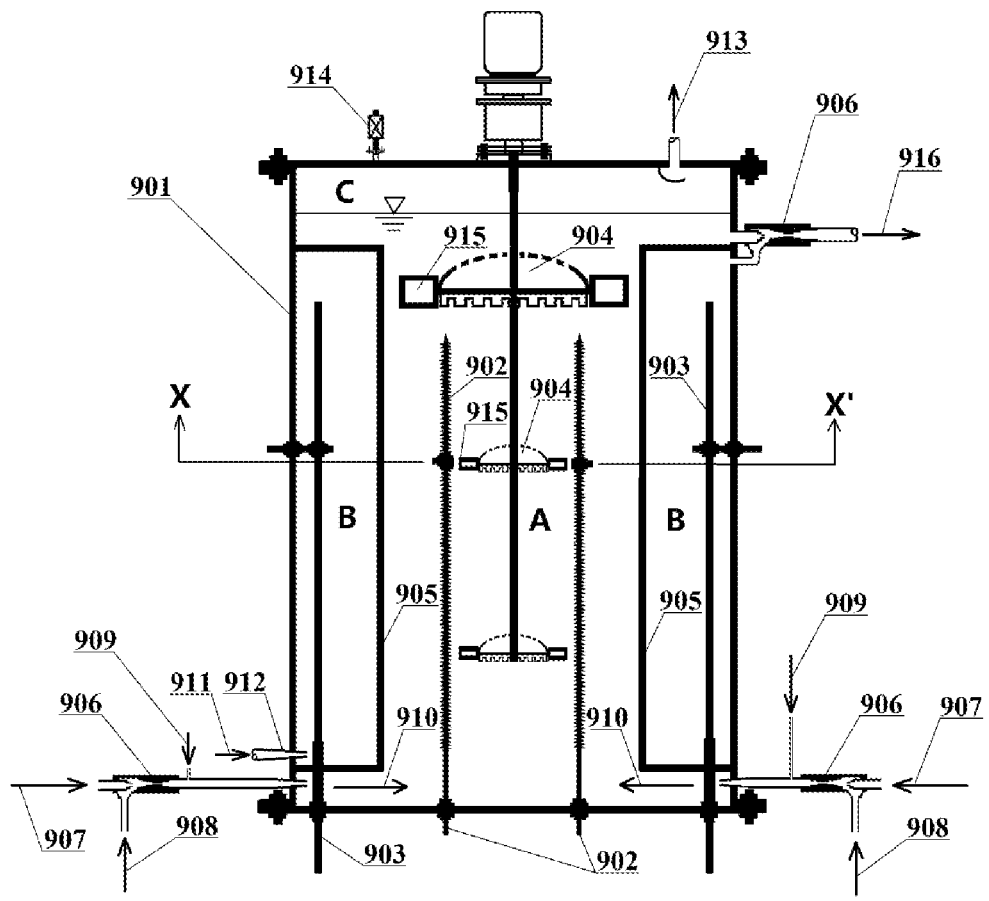
FIGS. 11A to 11F show the pH-swing system of the present invention, where
Figure 11B:
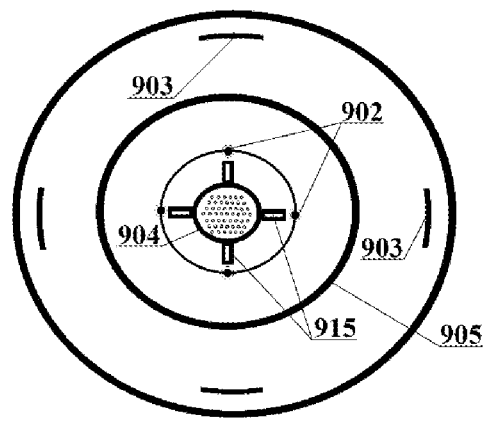

For the System C, either a pH-swing hydration reactor 901 (shown in FIG. 11A) or a direct hydration reactor 1001 (shown in FIG. 12A) can be selected for the fixation of $CO_2(g)$ collected from either ambient air or from any point source emissions containing $CO_2$ (such as from a fossil fuel power plant or any industrial manufacturing plants which generated $CO_2$ emissions). The direct hydration is more appropriate to be used "in the ocean" options where the pH values are already in the suitable ranges for the bicarbonate fixation. However, the pH-swing hydration can be used for both "above ground" and "in the ocean" options, where the high pH condition can be achieved through electrolysis to a desirable value to expedite the $CO_2(g)$ fixation. When the pH-swing hydration reactor 901 is selected, as shown in FIGS. 11A and 11B, cathodes 902 and anodes 903 are provided to create a cathodic zone A and anodic zone B, respectively, in the cylindrical reactor by a cylindrical separation plate 905. Air rising retardation devices 904 are provided to increase the detention time of air bubbles in the injected flow 910 created by modified venturi devices 906. Four modified venturi devices 906 are arranged along the cylindrical pH-swing reactor 901, so turbulent flow conditions can be provided to expedite the dissolution of $CO_2$ and $O_2$ in air streams 908. Four turbine mixers 915 attached to each of the air rising retardation device 904 are provided to circulate the local fluid flow directions so the gas dissolution time can be increased. For the "in the ocean" option, brine (or seawater) input streams 907 from the desalination system and $CO_2(g)$ loaded air input streams 908 are injected into the modified venturi devices 906 for mixing. For the "above ground" option, freshwater streams can be selected for input streams 907, as will be further explained in FIGS. 11C and 11E. Air recirculation flows 909, branching out into four streams from a waste air output flow 913 (i.e., formed by air input flow 908 after dissolved gases such as $CO_2$ and $O_2$ have been removed) and recirculating by a pump (not shown), are also injected into input streams of modified venturi devices 906. The waste air output flow 913 is withdrawn from a zone C which is created by the waste air cumulated in the pH-swing reactor 901. The waste air output flow 913 can be either recycled or discharged. The waste air output flow 913 also can be used to assist the discharge of any fluid from Systems A or B into the ocean to reduce the density of the discharged fluid so dissipation can be achieved more easily as mentioned previously in the PFD diagrams. A freshwater flow 911 (from a desalination module for the "in the ocean" option, or from a river or a wastewater treatment plant, used as a freshwater source for anodic zone B) is injected into the anodic zone B by a nozzle 912 to create a tangential flow in the zone B. Freshwater is used for anodic zone B to prevent the chlorine gas generation during electrolysis. The cathodic fluid in zone A is mixed with anodic fluid in zone B with a modified venturi 906, as shown in FIG. 11A right outside the reactor, to complete the electron neutrality condition and prevent the chlorine gas generation. The pH-swing reactor design as shown in FIG. 11A is used to generate carbonate species in the output stream 916 for carbon dioxide removal sequestration. In this design, for the above ground option of carbon dioxide removal sequestration when freshwater is used in the cathodic zone A, carbonic acid concentration will be increased in the output stream 916. In this situation, the carbonate acid can be reduced or eliminated by the weathering reactions with sequestered location minerals as discussed above to convert to bicarbonate species. In order to ensure the saturation condition is reached, the detention time for the design of the pH-swing reactors is selected at 2.5 sec.

Figure 11C:
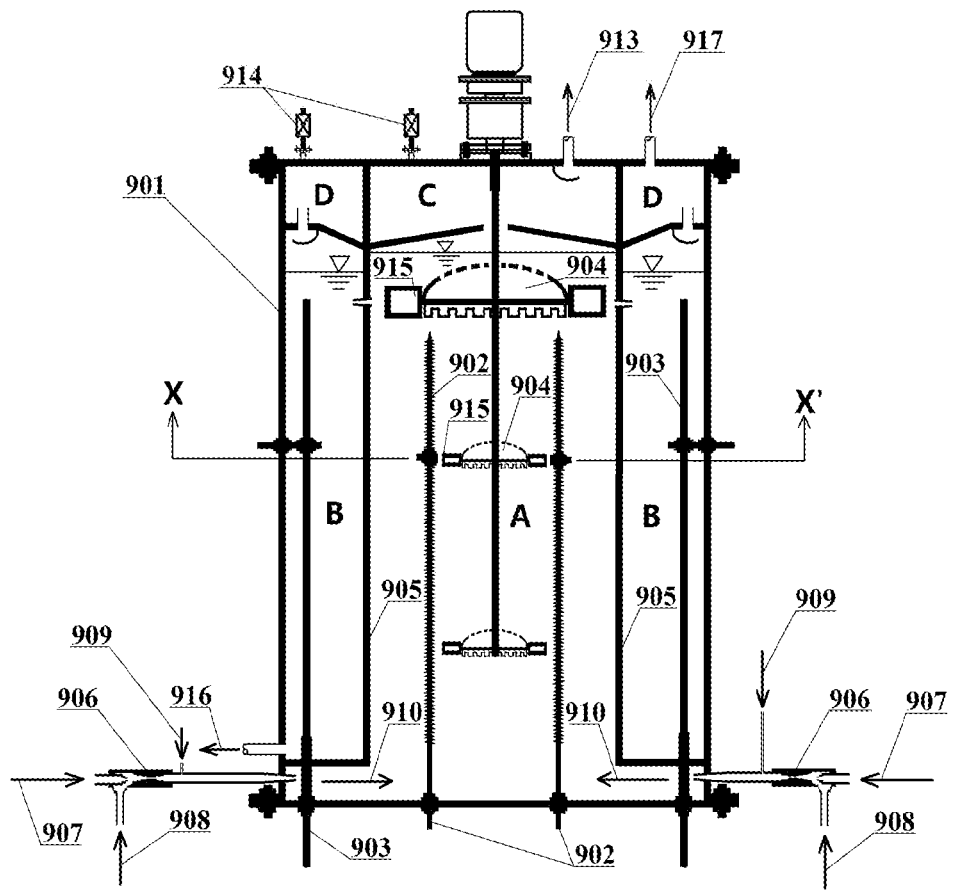
Figure 11D:
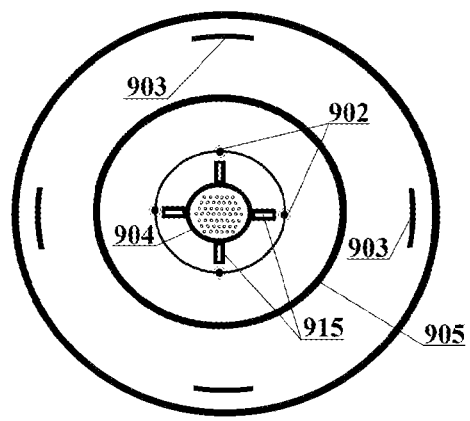

If the collected carbon dioxide is intended for the utilization purposes, the pH-swing reactor of FIGS. 11A and 11B can be modified to FIGS. 11C and 11D, where the cathodic fluid is mixing with the anodic fluid in the zone B. Where the acidic condition in the zone B will promote the conversion of hydrated carbon species back to $CO_2(g)$ for the collection and utilization. The gases generated in the zone B, besides $CO_2(g)$, also will contain some $O_2$ gas, as shown in Equation 18 above (i.e., every 4 moles of $H^+$ consumed will generate 1 mole of $O_2$). This mixed $CO_2$ and $O_2$ gases may be recovered through output flow 917 from zone D, which is separated from zone C by the same cylindrical separation plate 905. Reactor design shown in FIGS. 11C and 11D can recover $CO_2(g)$ which is allowing some mixtures of oxygen gas.

Figure 11E:
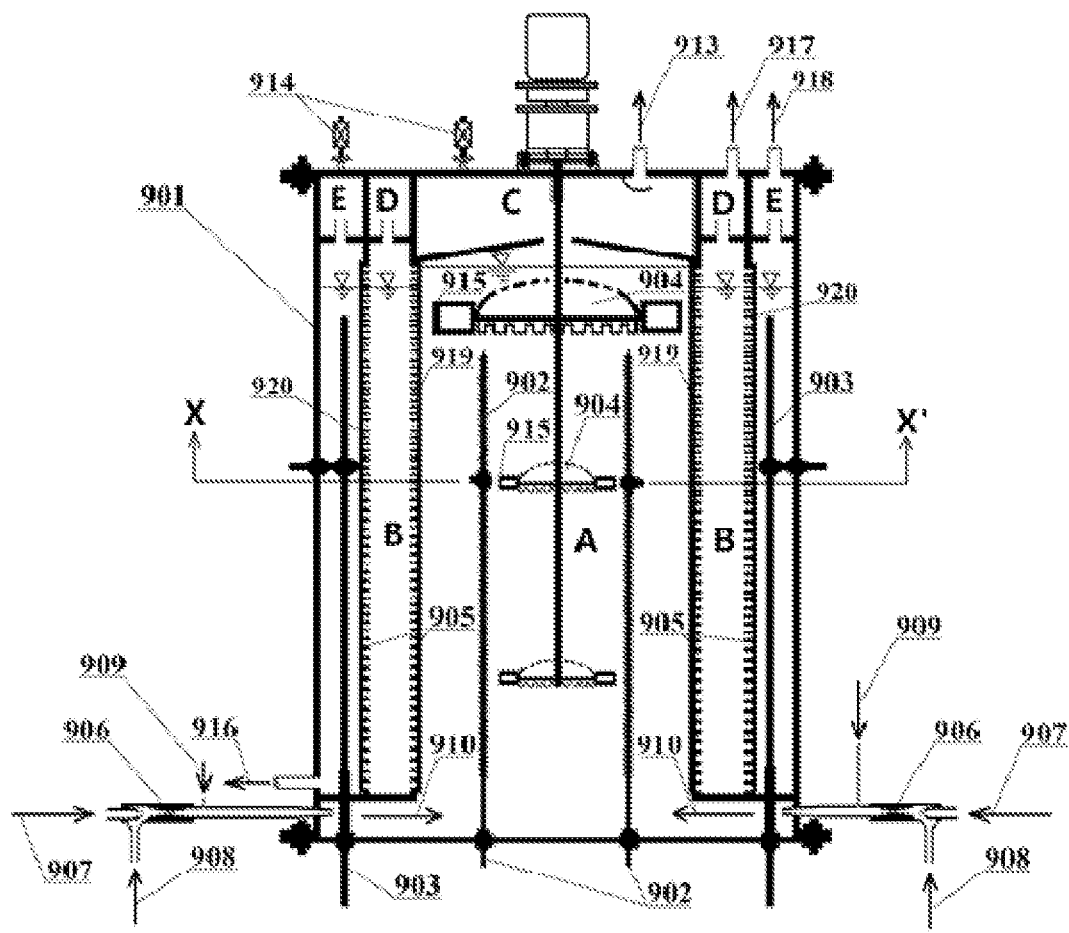
Figure 11F:
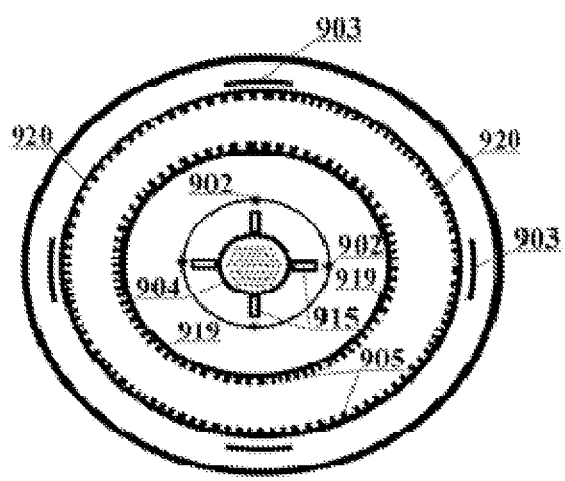

When a pure $CO_2(g)$ utilization option is required, another modification of reactor 901 can be adopted as shown in FIGS. 11E and 11F. In this design, the existing cylindrical separation plate 905 is changed to a porous cylindrical separation plate 905 and covered by an anionic membrane 919. Another new porous cylindrical separation plate 905 near anodic electrodes 903 is provided and covered by a cationic membrane 920, as shown in FIGS. 11E and 11F. In this design, the $H^+$ can filter through the cationic membrane, and bicarbonate and carbonate ions can filter through the anionic membrane to form a pure $CO_2(g)$ and collected in zone D and output through output flow 917. Other oxygen gas is formed and collected in zone E and output through output flow 918. In this case, only freshwater input stream 907 is used, and the output stream 916 can be discharged.

Figure 12A:
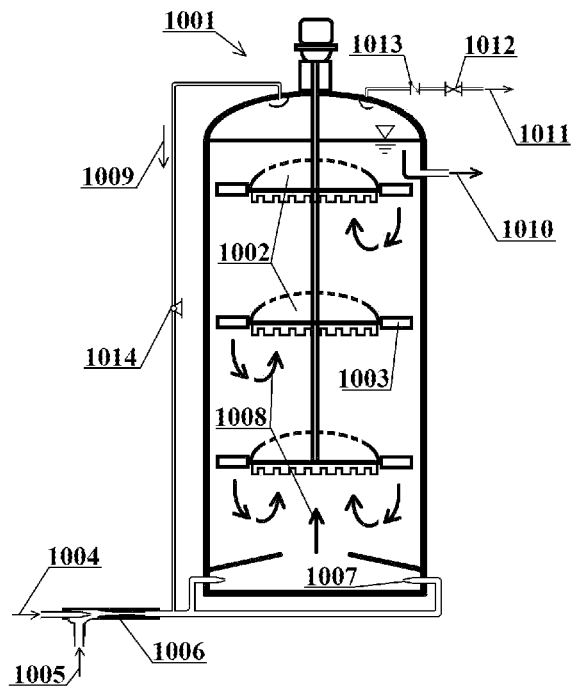
FIGS. 12A and 12B show the direct hydration reactor for carbon dioxide capture and removal in the present invention, where
Figure 12B:
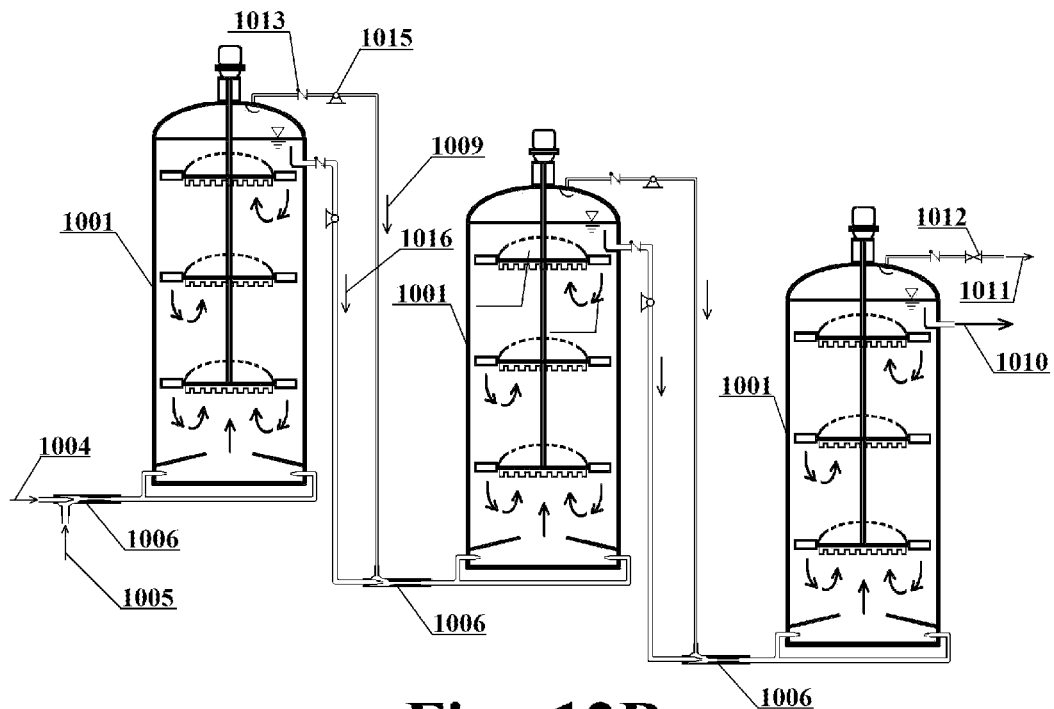

When a direct hydration reactor 1001, as shown in FIG. 12A for fixing the $CO_2(g)$ into mainly bicarbonate species, a brine (or seawater) stream 1004 from the desalination system and a $CO_2(g)$ loaded air stream 1005 from ambient air or from a point source are injected into a modified venturi device 1006 near bottom of the pressurized cylindrical shape direct hydration reactor 1001 to create turbulent flow conditions to expedite the dissolution and fixation of $CO_2(g)$ in air streams 1005. Similar to that of the pH-swing reactor, air rising retardation devices 1002 and turbine mixers 1003 are provided to create the circulation of the local fluid flow directions 1008 so the detention time for gas dissolution can be increased. The waste air at the top of the direct hydration reactor 1001 can be recirculated by a pipeline which an air flow 1009 is pumped by a pump 1014 to join the flow from the modified venturi device 1006. Again, the injected flow 1007 will be forced to become a highly turbulent flow to increase the dissolution rates of gases. The waste air stream 1011 collected and stored in the top of the reactor can be discharged and controlled by a check valve 1013 and a valve 1012. A bicarbonate hydrated output fluid 1010 is pumped to the System D for sequestration. As discussed previously, the dissolution time needed for a $CO_2(g)$ loaded stream may require about 100 sec to reach a saturation condition. To increase the $CO_2(g)$ dissolution concentration, the direct hydration reactor 1001 is pressurized by the brine (or seawater) stream 1004. Levels of pressure for the direct hydration reactor 1001 can be selected similar to that of the RO reactor (System B) which supplying the brine or seawater to the reactor, or the pressure needed for the subsequent sequestration (System D). To reduce the reactor sizes and increase the dissolution efficiency, the direct hydration reactor 1001 can be divided into multiple reactors in series, as shown in FIG. 12B. In order to ensure the saturation condition is reached, the overall detention time for the design of the direct hydration reactors is selected at a range of 100 to 150 sec.

Figure 13:
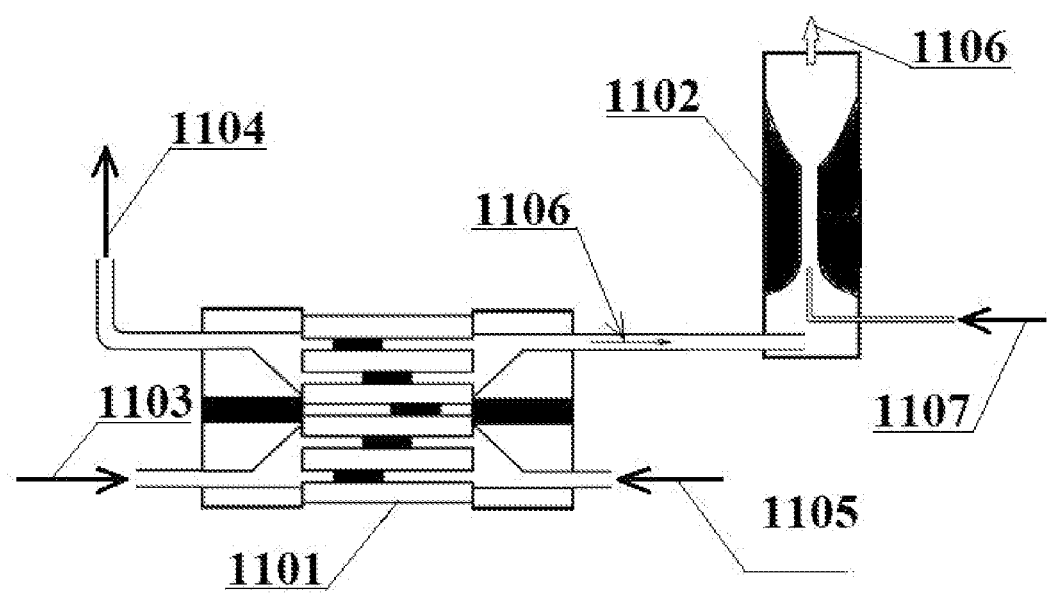
FIG. 13 shows the energy exchange and modified venturi device in the present invention.

In the invention an energy exchanger 1101, as shown in FIG. 13, is used in many situations including increase of pressure for draw solution, or for RO input flow, as discussed previously in this report. The combination of an energy exchanger 1101 with a modified venturi 1102 also can be used to discharge of low-pressure fluids under high-pressure environments. As shown in FIG. 13, A low pressure fluid 1103 is entering to the energy exchanger 1101 to increase the pressure of an output fluid 1104. A high-pressure fluid 1105, which can be from the hydraulic pressure created by the gravity such as shown in seawater depths 403, 503, and 706 in FIGS. 6, 7 and 9, respectively. After energy exchange, the pressure of a low-pressure output fluid 1106 is discharged with the aid from a modified venturi 1102, which provides an air stream 1107 to reduce the density for the fluid 1106 to dissipate.

The present invention provides the method and apparatus are disclosed for carbon dioxide removal and sequestration from ambient air or point source emissions by integration of four self-sufficient systems including a PEO renewable energy generation system, a desalination system, a pH-swing hydration or a direct hydration system, and a bicarbonate fixed, and alkalinity enhanced dense brine sequestration system, in which, the synergy between the PEO energy generation system and other three systems including provision of all needed renewable energy for operation of other three systems, the synergy between the desalination and other systems including provision of freshwater needed for the PEO energy generation system and the pH-swing system, as well as provision of a dense brine fluid from the desalination system to the pH-swing or the direct hydration system, and in the case of available freshwater supply where the desalination system can be avoided, and therefore, the present invention can be run anywhere in the world in terrestrial or marine environments as long as the carbon dioxide removal plant installation area is available and sequestration sinks can be located nearby or utilization of the captured carbon dioxide can be utilized for industrial or agricultural purposes when needed.

Principles, methods and major apparatus are described above to explain the subject invention. It will be apparent to one of ordinary skill in the art that many changes and modifications can be made thereto without departing from the spirit or scope of the appended claims.

I claim:

1. A method for removing and sequestering carbon dioxide, comprising installing and applying an integrated and self-sufficient system in an ocean environment, wherein the integrated system comprises a pressure-enhanced osmosis (PEO) renewable energy generation system, a desalination system, a pH-swing hydration or a direct hydration system, and a carbonate sequestration system that are integrated with each other and have synergistic effects, applying the PEO renewable energy generation system to provide renewable energy for operating the desalination system, the pH-swing hydration or the direct hydration system, and the carbonate sequestration system for carbon removal and sequestration, applying the desalination system to provide freshwater for the PEO renewable energy generation system and the pH-swing hydration system, and concentrated brine to the pH-swing hydration or the direct hydration system to enhance carbon dioxide hydration and fixation capacity to stable bicarbonate and to form a dense alkalinity enhanced and bicarbonate fixed brine for safe sequestration, applying the pH-swing hydration or the direct hydration system to fix collected carbon dioxide gas from ambient air or point source emissions into mainly bicarbonate species by using the energy from the PEO renewable energy generation system, the brine and freshwater from the desalination system, and generating the dense alkalinity enhanced and bicarbonate fixed brine for the carbon sequestration system, and applying the carbon sequestration system to store the dense alkalinity enhanced and bicarbonate fixed brine into marine sediments below a bioturbation layer, wherein the energy required for the systems are all generated in-situ, and all materials required for the systems are withdrawn and produced from in-situ seawater to form the integrated and self-sufficient system for carbon removal and sequestration.

2. The method for removing and sequestering carbon dioxide according to claim 1, wherein the PEO renewable energy generation system, the desalination system, and the hydration system are located in the ocean environment at a same depth on an ocean floor, installed with optionally an enclosure structure, and using seawater gravity to supply pressure for operation.

3. The method for removing and sequestering carbon dioxide according to claim 2, wherein the same depth on the ocean floor is optimized by selecting for the PEO renewable energy generation system at a depth equivalent to $\frac{1}{2}\alpha\beta\Delta\pi_o$ of pressure, $\alpha$ is a membrane efficiency factor representing an efficiency of pressure loss across the membrane, and $\beta$ is a dilution factor=$Q_2/(Q_1+Q_2)$, $Q_1$ is a permeate flux, $Q_2$ is a draw solution flux, and $\Delta\pi_o$ is a theoretical maximum osmotic pressure differential in a forward osmosis reactor of the PEO renewable energy generation system, and a pressure is provided to reverse osmosis operation in the desalination system by power generated by the PEO renewable energy generation system.

4. The method for removing and sequestering carbon dioxide according to claim 3, wherein the optimum depth is selected at between 540 m to 820 m for the desalination system with the reverse osmosis operation, the depth of the hydration system is selected at the same depth as the desalination system, and the optimum pressure of a seawater draw solution needed for the PEO renewable energy generation system is adjusted by an energy exchanger.

5. A method for removing and sequestering carbon dioxide, comprising:

installing and applying an integrated and self-sufficient system in an ocean environment, wherein the integrated system comprises a pressure-enhanced osmosis (PEO) renewable energy generation system, a pH-swing hydration or a direct hydration system, and a carbonate sequestration system that are integrated with each other and have synergistic effects, applying the PEO renewable energy generation system, with a forward osmosis (FO) module for generating power by a semipermeable membrane with seawater as a draw solution and the freshwater as a feed solution, to provide renewable energy for operating the pH-swing hydration or the direct hydration system, and the carbonate sequestration system for carbon removal and sequestration, applying the freshwater with a penstock to bring the freshwater to the PEO renewable energy generation system depth location and employing a hydraulic power generation facility to provide extra renewable energy for operating the pH-swing hydration or the direct hydration system and the carbon sequestration system, and to provide freshwater to the pH-swing hydration system to enhance carbon dioxide fixation and avoid chlorine gas generation, applying the in-situ seawater for the pH-swing hydration with a pH-swing reactor (901) or the direct hydration system with a direct hydration reactor (1001) to fix a collected carbon dioxide gas, from ambient air or point source emissions into bicarbonate fixed fluid, for the carbon sequestration system, and applying the carbon sequestration system with an injection system to store the bicarbonate fixed fluid into marine sediments below a bioturbation layer, wherein the energy required for the integrated system is all generated in-situ, and all materials required for the systems are withdrawn and produced from in-situ seawater to form the integrated and self-sufficient system for carbon removal and sequestration.

6. The method for removing and sequestering carbon dioxide according to claim 2, wherein a bicarbonate fluid for the sequestration system is injected at a selected depth at at least one hundred meters below a marine sediment in either a continental shelf, a continental slope, or a continental rise area, and an estimated top boundary of a final injection plume of the sequestered bicarbonate fluid is selected at least ten meters below a bioturbation layer of the marine sediments to prevent impacts to any marine life living on or in the marine sediments.

7. The method for removing and sequestering carbon dioxide according to claim 1, wherein the PEO renewable energy generation system, the desalination system, and the hydration system are located in an ocean at different depths on an ocean floor with or without an enclosure structure for each system using a seawater gravity to supply pressure for operation.

8. The method for removing and sequestering carbon dioxide according to claim 7, wherein individual optimum depths are selected as follows:

(1) an optimum depth equivalent to $\frac{1}{2}\alpha\beta\Delta\pi_o$ of pressure is selected for the PEO renewable energy generation system, α is a membrane efficiency factor representing an efficiency of pressure loss across a membrane, and β is a dilution factor=$Q_2/(Q_1+Q_2)$, $Q_1$ is permeate flux, $Q_2$ is draw solution flux, and $\Delta\pi_o$ is theoretical maximum osmotic pressure differential in the forward osmosis reactor of the PEO renewable energy generation system;

(2) an optimum depth in a range of 540 m to 820 m is selected for the desalination system with reverse osmosis operation, and depth for the hydration system is the same as the desalination system;

(3) when freshwater is available, the desalination system is replaced by an extra hydraulic power generation facility located at the same depth as the PEO renewable energy generation system by bringing down freshwater to the hydraulic power generation facility with a penstock;

(4) depths for injecting a bicarbonate fluid for the sequestration system is selected at at least 100 meters below the marine sediment in either a continental shelf, a continental slope, or a continental rise area where an estimated top boundary of a final injection plume of the sequestered bicarbonate fluid is at least ten meters below a "bioturbation layer" of the marine sediments to prevent impacts to marine life living on or in the marine sediments.

9. A method for removing and sequestering carbon dioxide, comprising installing and applying an integrated and self-sufficient system in an above ground environment, wherein the integrated system comprises a Pressure Enhanced Osmosis (PEO) renewable energy generation system, a pH-swing hydration or a direct hydration system, and a carbonate sequestration system that are integrated with each other and have synergistic effects, applying the PEO renewable energy generation system, with a forward osmosis (FO) module for generating power by a semipermeable membrane with a concentrated stable and nontoxic draw solution and freshwater as a feed solution, to provide renewable energy for operating the pH-swing hydration or the direct hydration system, and the carbonate sequestration system for carbon removal and sequestration, applying the freshwater to the pH-swing hydration with a pH-swing reactor (901) or to the direct hydration system with a direct hydration reactor (1001) to fix a collected carbon dioxide gas, from ambient air or point source emissions, into bicarbonate fixed fluid for the carbon sequestration system.

10. A PEO renewable energy generation system used in the method for removing and sequestering carbon dioxide according to claim 9, wherein the PEO renewable energy generation system uses a draw solution with a concentrated fluid prepared from organic species comprising fulvic acid in 100 to 500 molecular weight, and the draw solution is re-concentrated and recycled by or ultrafiltration to avoid constant supply of the draw solution chemicals.

11. A method for converting an existing desalination plant to an integrated desalination, PEO energy generation and carbon dioxide hydration and sequestration facility as described in claim 1, comprising using penstocks to divert portion of the freshwater and all of the brine produced by the desalination plant to an optimum depth equivalent to $\frac{1}{2}\alpha\beta\Delta 90_o$ of the PEO renewal energy generation system, wherein α is a membrane efficiency factor representing an efficiency of pressure loss across the membrane, β is a dilution factor and is $Q_2/(Q_1+Q_2)$, $Q_1$ is permeate flux, $Q_2$ is draw solution flux, and $\Delta\pi_o$ is theoretical maximum osmotic pressure differential in a forward osmosis module of the PEO renewable energy generation system, β is selected at a range of 0.8 to 0.9, using about 10% to 20% of freshwater produced by the desalination plant as a feed solution for the PEO renewal energy generation system, using all the brine produced by the desalination plant by the PEO renewal energy generation system as the draw solution, and before using the both freshwater and brine as the feed and draw solutions, applying sets of turbine-generator for extra hydraulic power generation, using a final brine fluid generated in subsequent $CO_2(g)$ hydration and marine sediment sequestration systems to discharge brine and sequestered carbonate fluid.

12. A cylindrical pH-swing hydration reactor for the fixing and sequestering $CO_2(g)$ collected from either ambient air or from point source emissions used in the method for removing and sequestering carbon dioxide as described in claim 1, comprising:

a cylindrical separation plate (905) providing inside the cylindrical pH-swing hydration reactor (901) to separate the cylindrical reactor into a cathodic zone A and an anodic zone B, multiple cathodes (902) providing in the cathodic zone A, multiple anodes (903) providing in the anodic zone B, multiple air rising retardation devices (904) installing in the cathodic zone A to increase the detention time of air bubbles to enhance the $CO_2(g)$ hydration into bicarbonate ion and carbonate ion species, multiple turbine mixers (915) attaching to each of the air rising retardation device (904) to provide circulation of fluid flow directions in the zone A to increase gas dissolution time, multiple modified venturi devices (906) arranging near bottom and along the outside boundary of the cylindrical pH-swing reactor (901) to inject brine or seawater into the zone A to create turbulent flow conditions to expedite the dissolution and fixation of $CO_2(g)$ in air streams (908), a nozzle (912) for the inject of a tangential freshwater flow into the zone B for electrolysis to prevent chlorine gas generation during electrolysis, a waste air zone C at top of the pH-swing reactor (901) for the storage and discharge of a waste air output flow (913), and a modified venturi device (906) near top of zones A and B to mix electrolytes from zones A and B, for discharging fixed carbonate fluid for sequestration.

13. A cylindrical pH-swing hydration reactor according to claim 12, wherein the cylindrical pH-swing hydration reactor is converted to a pure $CO_2(g)$ fixation, recovery, and utilization reactor by changing an existing cylindrical separation plate to a porous cylindrical separation plate, and covering the porous plate by an anionic membrane (919), and installing another new porous cylindrical separation plate (905) near anodic electrodes (903) and covering by a cationic membrane (920), in order for the $H^+$ generating by the anode electrodes to filter through the cationic membrane, and bicarbonate and carbonate ions generating in the zone A to filter through the anionic membrane to form a pure $CO_2(g)$ and collected in zone D and output through output flow (917) for collection and utilization, with other oxygen gas collecting in zone E to separate from the pure $CO_2(g)$.

14. A cylindrical direct hydration reactor for fixing and sequestering $CO_2(g)$ collected from either an ambient air or from point source emissions used in the method for removing and sequestering carbon dioxide as described in claim 1, comprising:

- multiple air rising retardation devices (1002) to increase detention time of air bubbles in the reactor to enhance the $CO_2(g)$ hydration into mainly bicarbonate ion species,
- multiple turbine mixers (1003) attaching to each of the air rising retardation device (1002) to provide circulation of fluid flow directions in the reactor to increase $CO_2(g)$ dissolution time,
- a modified venturi device (1006) arranging near bottom of the direct hydration reactor (1001) to inject brine or seawater into the reactor to create turbulent flow conditions to expedite the dissolution and fixation of $CO_2(g)$ in air streams (1005),
- a waste air zone at top of the reactor (1001) for the storage and discharge of a waste air output flow (1011), and
- a bicarbonate hydrated output fluid (1010) is pumped to a sequestration area.

15. A cylindrical direct hydration reactor according to claim 14, wherein the cylindrical direct hydration reactor is converted into multiple reactors in series to reduce the reactor sizes and increase the dissolution efficiency, selecting an overall detention time for the reactor design at the range of 100 to 150 sec to ensure reaching saturation condition, and selecting a pressure for the multiple direct hydration reactors (1001) as that of a reverse osmosis desalination reactor for supplying brine or seawater to the multiple cylindrical direct hydration reactors (1001) or a reactor pressure for the multiple direct hydration reactors (1001) for subsequent injection of a sequestration fluid.

\* \* \* \* \*